United States Patent
Papakostas

(10) Patent No.: US 10,001,894 B2
(45) Date of Patent: Jun. 19, 2018

(54) METHOD FOR CALIBRATING A RESISTIVE CONTACT SENSOR

(71) Applicant: R&D CORE LIMITED, Leatherhead (GB)

(72) Inventor: Thomas Papakostas, Leatherhead (GB)

(73) Assignee: R&D CORE LIMITED, Leatherhead (GB)

( * ) Notice: Subject to any disclaimer, the term of this patent is extended or adjusted under 35 U.S.C. 154(b) by 324 days.

(21) Appl. No.: 14/766,655

(22) PCT Filed: Feb. 10, 2014

(86) PCT No.: PCT/GB2014/050379
§ 371 (c)(1),
(2) Date: Aug. 7, 2015

(87) PCT Pub. No.: WO2014/122481
PCT Pub. Date: Aug. 14, 2014

(65) Prior Publication Data
US 2016/0048245 A1 Feb. 18, 2016

(30) Foreign Application Priority Data
Feb. 8, 2013 (GB) ................................... 1302254.6

(51) Int. Cl.
G06F 3/045 (2006.01)
G06F 3/041 (2006.01)
G06F 1/16 (2006.01)

(52) U.S. Cl.
CPC ............... *G06F 3/045* (2013.01); *G06F 1/16* (2013.01); *G06F 3/0418* (2013.01);
(Continued)

(58) Field of Classification Search
CPC .......... G06F 3/045; G06F 3/0418; G06F 1/16; H01H 2203/01; H01H 2205/002; H01H 2239/078; H01H 2205/004
See application file for complete search history.

(56) References Cited

U.S. PATENT DOCUMENTS

| | | | |
|---|---|---|---|
| 3,662,105 | A | 5/1972 | Hurst et al. |
| 4,564,079 | A | 1/1986 | Moore et al. |

(Continued)

FOREIGN PATENT DOCUMENTS

| | | |
|---|---|---|
| EP | 0541102 A1 | 5/1993 |
| FR | 2831707 A1 | 5/2003 |

(Continued)

OTHER PUBLICATIONS

Sep. 23, 2014—(WO) International Search Report and Written Opinion—APP PCT/GB2014/050379.

(Continued)

*Primary Examiner* — Michael J Jansen, II
*Assistant Examiner* — Ivelisse Martinez Quiles
(74) *Attorney, Agent, or Firm* — Banner & Witcoff, Ltd.

(57) ABSTRACT

A method of operating a contact sensor and a method of calibration of a contact sensor. The contact sensor comprises an array of discrete and spaced apart sensing elements (102, 202) connected to a resistive element (101, 201) with the location or size of a contact being detectable by measurement of one or more electrical parameter(s) relating to impedance steps along the resistive element (101, 201) is described. The method of operating involves determining a length of the sensing element between the contact and the resistive element and using this to compensate for a parasitic resistance present in the measured resistance of the resistive element. The method of calibration comprises applying one or more calibration contact(s) at a plurality of locations (Continued)

across the sensing elements (102, 202) to be calibrated; monitoring changes in at least one electrical parameter during the time that the calibration contact(s) are applied; and recording information relating to variation in the at least one electrical parameter, the information allowing assessment of the variation in each impedance step across the measured sensing elements. This enables the later use of the sensor to take into account any variation in the impedance steps.

19 Claims, 15 Drawing Sheets

(52) U.S. Cl.
CPC ... *H01H 2203/01* (2013.01); *H01H 2205/002* (2013.01); *H01H 2205/004* (2013.01); *H01H 2239/078* (2013.01)

(56) References Cited

U.S. PATENT DOCUMENTS

| | | | |
|---|---|---|---|
| 4,587,378 A | | 5/1986 | Moore |
| 4,945,651 A | | 8/1990 | Georg |
| 4,963,702 A | | 10/1990 | Yaniger et al. |
| 5,079,949 A | | 1/1992 | Tamori |
| 5,159,159 A | * | 10/1992 | Asher .................... G01L 1/205 178/18.05 |
| 5,623,760 A | | 4/1997 | Newham |
| 5,804,773 A | | 9/1998 | Wilson et al. |
| 5,822,223 A | | 10/1998 | Genest |
| 6,016,140 A | * | 1/2000 | Blouin .................. G06F 3/0418 178/18.02 |
| 6,225,911 B1 | | 5/2001 | Nagamasa et al. |
| 6,577,250 B1 | * | 6/2003 | Yee ........................ H03M 11/24 341/26 |
| 6,977,646 B1 | * | 12/2005 | Hauck .................. G06F 3/0418 345/173 |
| 7,609,418 B2 | | 10/2009 | Takahashi |
| 2003/0079920 A1 | | 5/2003 | Rantet |
| 2009/0303196 A1 | | 12/2009 | Furukawa |
| 2010/0097343 A1 | | 4/2010 | Fang |
| 2010/0188345 A1 | | 7/2010 | Keskin et al. |
| 2011/0134069 A1 | * | 6/2011 | Shen .................... G06F 3/0418 345/174 |
| 2011/0193808 A1 | * | 8/2011 | Naka .................... G06F 3/0418 345/173 |
| 2012/0280946 A1 | * | 11/2012 | Shih ........................ G06F 3/045 345/178 |
| 2012/0293455 A1 | * | 11/2012 | Shen .................... G06F 3/0418 345/174 |
| 2014/0002417 A1 | * | 1/2014 | Yoshida .................. G06F 3/044 345/174 |

FOREIGN PATENT DOCUMENTS

| | | |
|---|---|---|
| GB | 2508626 A | 6/2014 |
| GB | 2511188 A | 8/2014 |

OTHER PUBLICATIONS

May 7, 2013—(GB) Search Report—APP 1302254.6.
Feb 2, 2015—(GB) Exam Report—APP 1302254.6.

* cited by examiner

METHOD FOR CALIBRATING A RESISTIVE CONTACT SENSOR

The present application is a U.S. National Phase of International Application No. PCT/GB2014/050379, filed on Feb. 10, 2014, designating the United States of America, and claims priority to British Patent Application No. 1302254.6, filed Feb. 8, 2013. This application claims priority to and the benefit of the above-identified applications, each of which is fully incorporated by reference herein.

The present invention relates to methods for operation of and calibration of a contact sensor apparatus and to contact sensor apparatuses for performing the methods.

Contact sensors or touch pads are used in numerous applications. They typically utilise a tactile sensor or an array of tactile sensors in combination with hardware or software processing to provide an indication of a contact by the user. The contact can be made by a finger or using a stylus, or it can be any other kind of contact area. For example a computer touch pad, as used on laptop computers in place of a mouse, detects contact by a user's finger and provides information relating to the location of the contact and movement of the contact point. This information can be used by the computer to control a cursor on screen or to perform other functions.

Various types of contact sensors are available. Pressure sensing contact sensors operate by determining a contact in accordance with the pressure applied at the contact area. One type of pressure sensor utilises multiple layers of conductive traces as the sensing elements, with adjacent layers having traces perpendicular to the traces of a facing layer. When a pressure is applied the traces on opposing layers come into contact and hence form an electrically conductive pathway. U.S. Pat. No. 4,587,378 discloses an example of such a sensor in the context of a touch tablet. The traces in one layer of U.S. Pat. No. 4,587,378 are interdigitated, i.e. formed by two interlocking arrays of traces. These traces face a second layer made up of parallel traces extending from a single resistive bar. Measurement of a contact on the sensor is achieved by measurement of electrical parameters that change when the traces of the two layers come into electrical contact due to the pressure on the surface of the sensor.

Other systems are also known in the prior art that utilise discrete and spaced apart sensor elements to provide an indication of the location and in some cases also the length of area of a contact on the sensing surface. A common feature is the use of variations in the resistance of an electrical circuit to determine the location and/or size of the contact. Elements of the circuit such as resistor strips act as resistive elements with a series of impedance steps. When different sensing elements are actuated by a contact on the sensor then a different number of impedance steps will be made a part of the circuit or alternatively will be shorted out of the circuit. The resistive element can for example be a resistor strip in the form of an elongate ribbon of resistive material, or a large area or layer of resistive material or discrete resistor components.

The location and/or size of a contact is measured by means of measurement of an electrical parameter that forms an output from the circuit. The electrical parameter is related to the change in resistance that occurs due to the contact on the sensor. The resistance could be measured directly or it could be quantified by measurement of a voltage or current value when a known loading is applied to the resistive element.

In the prior art, sensors are manufactured so that the electrical circuit has uniform features for each of the sensing elements, such as uniform steps in resistance along a resistive element. In some instances, to ensure uniformity, the manufacturing process can include measurement of individual resistor steps and adjusting their values, for example by cutting notches on the surface of printed resistors in a flexible circuit. In other instances the resistive element consists of a series of discrete resistors; such resistors can potentially have a tighter tolerance, but this comes at a greater cost.

Viewed from a first aspect, the invention provides a method of operating a contact sensor apparatus, the contact sensor apparatus being of the type comprising two layers, each layer having an array of discrete and spaced apart sensing elements in the form of multiple conductive traces connected to a resistive element, such that the conductive traces from each layer face each other to form a grid of points of intersection of traces, wherein a contact on the sensor elements causes an electrical connection between the two layers and hence a short between two or more conductive traces in each layer such that the contact can be detected by measurement of electrical parameters of one or both of the two resistive elements, the method being carried out when a contact is applied to the apparatus, and the method comprising:

a) measuring the total resistance $R_{total}$ across a first resistive element of a first layer of the sensor, b) determining a length I, the length I being the distance from the contact along the trace to the edge of the first resistive element, by measurement of electrical parameters using a second resistive element of a second layer of the sensor;

c) estimating a resistance $R_{trace}$ of the parts of the conductive traces in the first layer that extend from the shorted traces at the contact to the edge of the first resistive element from the length I, a known total length L of the conductive trace and a known total trace resistance between the two ends of the trace, and d) subtracting $2R_{trace}$ from $R_{total}$ in order to eliminate an error in $R_{total}$ due to the parasitic resistance of the shorted conductive traces.

This method allows for improved accuracy in measurements of a contact on the contact sensor, for example in measurements of the location and/or the dimensions of a contact. Thus, typically, the measurement of $R_{total}$ in step (a) may be taken in order to detect the dimensions of a contact. The method can be applied to any sensor that utilises two layers of conductive traces in combination with a resistive element to provide two dimensional measurements. The accuracy of measurement in a first dimension using the first resistive element can be improved by estimation of a relevant parasitic resistance based on measurements in a second dimension using the second resistive element. The correction is particularly useful when the parasitic resistance from the parts of the conductive traces could be large, for example when the conductive traces need to be very narrow in width or have reduced conductivity. The method hence allows very long or narrow traces to be used, which can increase the sensor resolution and/or sensor size. Alternatively, or in addition, it allows expensive higher conductivity materials to be replaced with cheaper, lower conductivity materials.

In practice, it may be assumed that the total resistance $R_{total}$ can be approximated as a sum of the resistance of segments $R_1$ and $R_2$ of the first resistive element either side of the shorted conductive traces and of a parasitic resistance, wherein the parasitic resistance is dependent on the resistance $R_{trace}$ of the parts of the conductive traces, such that:

$$R_{total}=R_1+R_2+2R_{trace}$$

Thus, by subtracting $2R_{trace}$ from the total, the parasitic effect can be reduced or eliminated. It will be understood that the parasitic resistance may be dependent not only on the resistance $R_{trace}$ of the parts of the conductive trace but also on other factors of including the contact resistance $R_{contact}$ between the conductive traces at the points of intersection and the shorted resistance $R_{shorted}$ of the part of the resistive element between the shorted traces. Thus, $R_{total}$ may be found in accordance with the following equation, where the last term is the parasitic resistance:

$$R_{total} = R_1 + R_2 + \frac{(2R_{trace} + R_{contact})R_{shorted}}{(2R_{trace} + R_{contact}) + R_{shorted}}$$

However, by assuming that $R_{contact}$ is negligible and $R_{shorted}$ is substantial, then this equation can be simplified to the equation given above, with the parasitic resistance again approximated to $2R_{trace}$.

To measure the length I, any suitable known technique may be used for the sensor structure of interest in order to determine the location of the contact in the relevant dimension. For example, if a sensor as in U.S. Pat. No. 4,587,378 is used then the techniques described therein could be used to determine the length I and hence allow the resistance $R_{trace}$ to be determined. The measurement of electrical parameters using the second resistive element may include applying a current or voltage to one or both resistive elements, and measuring one or more of currents or voltages at the first resistive element and/or the second resistive element.

In one preferred example the method is used with a sensor apparatus comprising: a first insulative layer; a second insulative layer; the first resistive element being on the first insulative layer; the second resistive element being on the second insulative layer; a plurality of first conductive traces provided on the first insulative layer and electrically connected to the first resistive element; and a plurality of second conductive traces provided on the second insulative layer and electrically connected to the second resistive element, wherein the first insulative layer and second insulative layer face each other such that the plurality of first conductive traces face the plurality of second conductive traces with each of the first conductive traces extending across the plurality of second conductive traces and each of the second conductive traces extending across the plurality of first conductive traces thereby forming an array of points of intersection of the first and second conductive traces, wherein the first insulative layer and second insulative layer are spaced apart such that there is no electrical contact between the plurality of first and second conductive traces when a contact is not applied to the contact sensor, and wherein when a contact is applied there is an electrical contact between at least one of each of the plurality of first and second conductive traces in a region of the contact.

In this case, the length I can be determined by means of a measurement of an electrical parameter of the second resistive element in conjunction with measurements of the first resistive element by applying a constant current or a constant voltage across the second resistive element. In one example, a constant current source is used to supply a constant current across the second resistive element, and a high impedance voltage measuring circuit is used to measure a voltage across the first resistive element. The first resistive element may act as a wiper electrode to allow for measurement of the length I, which relates to the position of the contact along the second resistive element. The ratio of the voltage measured by the first resistive element and the voltage drop across the second resistive element when unloaded will be the same as the ratio of the trace length I of the end of the contact from the end of the second resistive element to the total length L of the second resistive element. Thus, the length I, which is the distance of the contact along the trace from the end of the first resistive element to the edge of the contact, is easily determined based on the measurement of the second resistive element.

The trace resistance contributing to the parasitic resistance can be estimated using any suitable formula, for example:

$$R_{trace} = R_{trace\ max} \times \frac{l}{L}$$

Other calculations could be used, such as making direct use of the voltage ratio described above, since this voltage ratio, with the current applied in the appropriate direction, will be the same as the ratio of I and L.

A second aspect of the present invention provides a contact sensor apparatus for carrying out the method of the first aspect of the present invention. Thus, the invention provides a contact sensor apparatus comprising a processor and two sensor layers, each layer having an array of discrete and spaced apart sensing elements in the form of multiple conductive traces connected to a resistive element, such that the conductive traces from each layer face each other to form a grid of points of intersection of traces, wherein a contact on the sensor element causes an electrical connection between the two layers and hence a short between two or more conductive traces in each layer such that the contact to be detected by measurement of electrical parameters of one or both of the two resistive elements, and wherein the processor is arranged to control the sensor in order to:

a) measure the total resistance $R_{total}$ across a first resistive element of a first layer of the sensor, b) determine a length I, the length I being the distance from the contact along the trace to the end of the first resistive element by measurement of electrical parameters using a second resistive element of a second layer of the sensor;

c) estimate a resistance $R_{trace}$ of the parts of the conductive traces on the first layer that extend from the shorted traces at the contact to the edge of the first resistive element from the length I, a known total length L of the conductive trace and a known total trace resistance $R_{trace\ max}$; and d) subtract $2R_{trace}$ from $R_{total}$ in order to eliminate an error in $R_{total}$ due to the parasitic resistance of the shorted conductive traces.

The sensor apparatus may comprise: a first insulative layer; a second insulative layer; the first resistive element being on the first insulative layer; the second resistive element being on the second insulative layer; a plurality of first conductive traces provided on the first insulative layer and electrically connected to the first resistive element; and a plurality of second conductive traces provided on the second insulative layer and electrically connected to the second resistive element, wherein the first insulative layer and second insulative layer face each other such that the plurality of first conductive traces face the plurality of second conductive traces with each of the first conductive traces extending across the plurality of second conductive traces and each of the second conductive traces extending across the plurality of first conductive traces thereby forming an array of points of intersection of the first and second conductive traces, wherein the first insulative layer and second insulative layer are spaced apart such that there is no electrical contact between the plurality of first and second conductive traces when a contact is not applied to the contact sensor, and wherein when a contact is applied there is an electrical contact between at least one of each of the plurality of first and second conductive traces in a region of the contact.

In this case, the length I can be determined by the processor carrying out steps as described above.

In preferred embodiments of the apparatus the processor may be arranged to carry out any or all of the preferred method steps set out above.

Viewed from a third aspect, the invention provides a method of calibration of a contact sensor apparatus of the type comprising an array of discrete and spaced apart sensing elements connected to a resistive element with the location or size of a contact being detectable by measurement of one or more electrical parameter(s) relating to impedance steps along the resistive element, the method comprising: applying one or more calibration contact(s) at a plurality of locations across the sensing elements to be calibrated; monitoring changes in at least one of the electrical parameter(s) during the time that the calibration contact(s) are applied; recording information relating to variation in the electrical parameter, the information allowing assessment of the variation in each impedance step across the measured sensing elements; and thereby enabling the later use of the sensor to take into account any variation in the impedance steps.

In the prior art, in order to determine the location and/or area of a contact a value is assigned to resistance steps indicative of a transition from one sensing element to the next. An assumption is made that the resistance steps are equal on the basis that the resistive elements used in the circuit for the sensor are manufactured to have consistent dimensions with consistently sized parts associated with the sensing elements and consistent material properties.

The inventor has realised that this assumption can in some cases be incorrect, with the error sufficient to result in significant measurement errors by the sensor. For example, in some screen printing processes for the printing of flexible circuits the distribution of the conductive 'ink' can become uneven, especially when the printing or curing process are poorly set up. This can lead to elements of the circuits being physically thicker at one end of an array than at the other, or the cured ink having inconsistent resistivity with a consequent variation in resistance. In addition, as sensors are miniaturised and sensor resolution is increased (with the spacing between sensing elements hence being decreased) there is a need for smaller circuit elements, which makes significant inconsistencies in the variation of resistance or equivalent measuring parameters more likely.

Furthermore, the inventor has realised that the assumption of and indeed the use of consistent impedance steps is not necessary since it can be replaced by the calibration method of the third aspect. This means that constraints on the manufacturing processes used to create the sensors are removed, both in terms of the types of process that can be used and also in terms of the level of accuracy demanded from the manufacturing processes.

The inventors have hence made the non-obvious realisation that there may be a problem of inaccuracy in manufacturing not previously considered in the prior art, and also that manufacturing inaccuracy can be addressed more effectively by calibration rather than by making improvements in manufacturing accuracy. Calibration by the method described above will address problems not hitherto considered in the art and provide significant advantages not only through the direct consequence of improved accuracy for the sensor, but also indirectly in removing constraints from the manufacturing process. This calibration method may be used in combination with the method of the first aspect, such that a sensor is first accurately calibrated and then operated with a correction for parasitic trace resistance. This allows for the increases in accuracy from both methods to be combined. In particular, the calibration method allows for increased accuracy in determining the length I.

The calibrated sensor may be a sensor that is arranged to sense only a single dimension, such as a length of a contact area. An example of such a sensor is a so-called "nip-width" sensor to detect the contact patch between mating rollers of the type used in paper processing facilities. In this case the sensor only needs to be calibrated along this single dimension and the calibration contact(s) can simply be at a plurality of locations along the extent of the sensing elements in the one dimension of the sensor.

Either or both method(s) may be used for calibration of sensors capable of sensing in two dimensions, for example sensors of the type having a two dimensional array of sensing elements, such as a two dimensional array of conductive traces with, for example, two non-parallel, possibly orthogonal, sets of traces, with the traces in each set being parallel. In this case, for the third aspect, the step of applying a calibration contact at a plurality of locations across an area may include applying one or more first calibration contact(s) at a plurality of locations across an area along a first dimension of the array of sensing elements, and applying one or more second calibration contact(s) at a plurality of locations across an area along a second dimension of the array of sensing elements. Alternatively, the method may comprise applying one or more calibration contact(s) at a plurality of locations varying along two dimensions of the sensor. This would for example be a diagonal sequence of locations for a sensor with two orthogonal dimensions. When a calibration contact at locations along two dimensions of the sensor is used then the calibration mode of the sensor may involve alternating measurements between the first and second dimension in order to gather calibration data for both dimensions.

The first and second dimensions may be a length and a width of the array, or any other set of dimensions, for example a circumferential and radial direction for a circular sensor area with circumferential and radial sensing elements. In this way the sensor can be calibrated taking into account variations in the electrical parameter for sensing elements relating to both dimensions of the sensor.

In some preferred embodiments the step of applying the calibration contact(s) at the plurality of locations across the area of the sensing elements to be calibrated includes a continuous movement of a calibration contact on a sensing surface of the sensor, for example a sliding motion of the calibration contact across the sensing surface. In this way the calibration contact may traverse a number of adjacent sensing elements in sequence, thereby permitting variations in the electrical parameter(s) to be determined for each of the individual sensing elements. The changes in the electrical parameter(s) are monitored as the moving contact traverses the array of sensing elements. This naturally allows the calibration of the sensor to be of the greatest accuracy. The sliding movement may be aligned with a dimension of the sensor, or it may be along two dimensions of the sensor as described above. Preferably there is only a single calibration contact when a sliding contact is used.

The speed of the movement of the calibration contact in a continuous movement can affect the quality of the data gathered. This is because the sampling rate required to capture sufficient samples for each impedance step will depend on the sensor resolution as well as on the speed of the moving calibration contact. Preferably the sampling rate allows for at least 10 samples for each of the impedance steps that is being measured. When a sliding motion along two dimensions of the sensor is used then it is preferred to increase the sampling rate. This is since in effect twice as much information needs to be gathered to calibrate the sensor in two dimensions simultaneously. Hence when a sliding motion along two dimensions of the sensor is used then preferably the sampling rate allows for at least 10 samples for each of the impedance steps in both of the two dimensions. This means that in preferred embodiments the speed of the movement of the contact is equal to or less than one tenth of the spacing between the sensing elements multiplied by the sampling rate used to measure the electrical parameter and optionally divided by the number of dimensions being measured (i.e. dividing by two for a diagonal sliding contact on a two dimensional sensor).

Alternatively, if a less data intensive calibration is required, and/or in circumstances where a linear or close to linear trend in the variation in the impedance steps is expected or known to be present, then the step of applying the calibration contact(s) at the plurality of known locations across the area of the sensing elements to be calibrated may take the form of placement of the calibration contact(s) at several locations that are spaced apart across the sensor area with a plurality of sensing elements between each location. Since each spaced location is separated by a plurality of sensing elements then the variation of the electrical parameter will be related to the summation of impedance steps across the plurality of sensing elements. The information relating to the impedance steps may be a mean average value for each of the plurality of sensing elements between each of the locations. It is necessary in this method for the locations of the calibration contact to be known in order to determine the number of impedance steps that the calibration contact is spaced from previous or subsequent calibration contact locations. This can be achieved by using a positioning guide as discussed below, or a programmed spacing for an automated calibration contact.

In another simple embodiment the calibration contact(s) may comprise multiple stationary contacts spaced apart in known locations on the array of sensing elements. Typically this would involve just two contacts, since many sensor designs do not allow for more than two simultaneous contacts per dimension to be recognised separately. With this arrangement the electrical parameter(s) may be measured with reference to the resistance of the part of resistive element relating to the spacing between the two stationary contacts, the resistance of the part of resistive element relating to the spacing between a first contact and an end of the array of sensing elements closest to that first contact and the resistance of the part of resistive element relating to the spacing between a second contact and an end of the array of sensing elements closest to that second contact. It will be understood that if the total resistance of the resistive element is known then only two of these three parts of the resistive strip need to be measured in order to determine the properties of the third part of the strip.

In some cases it may be difficult to ensure alignment with the dimension of interest when a manual sliding movement is used to calibrate the sensor, especially when the sensor has a high resolution and hence closely spaced sensing elements. Similarly, in some cases it may be difficult to ensure correct location of a stationary contact or a contact moving between a plurality of separate locations when the contact is applied manually. A guide may hence be provided to guide the movement and/or location of the calibration contact(s). The guide may for example take the form of a physical pattern or guide for locating a stylus or finger in a given position, or markings on the sensor surface for indicating where a contact should be made. When the sensor is a part of a touch sensitive display then markings may be displayed on the display to direct the user to the required contact locations for the calibration contact(s).

The method may include repetition of the movement of the calibration contact and repeated recording of variations of the electrical parameter. The repeated recorded values may be compared and if there is a discrepancy then one set of values may be rejected. The method may include prompting the user to repeat the movement of the calibration contact in this instance, in order to provide a replacement set of values. An average set of values for the resistance steps may be derived from the repeated sets of values. In this way a more accurate calibration can be obtained even with a manual movement of the calibration contact.

In one example the movement and/or plurality of locations of the calibration contact(s) align with a dimension measured by the sensing elements and are hence preferably parallel with the extent of the dimension measured by the sensing elements. This is not essential, since alignment of a calibration contact at an angle to this dimension would be along the dimension and would still traverse all the sensing elements in an area to be calibrated thereby enabling the required variation in the electrical parameter to be measured (as with the example above when a diagonal movement of the calibration contact is used). However in two dimensional sensor designs a movement lateral to a first dimension measured by the sensor can shift the calibration contact between one sensing element and another in a second dimension measured by the sensor as well as in the first dimension. As a consequence this can change the electrical circuit formed by the calibration contact on the sensor as a result of the sensing elements for the second dimension as well as the sensing elements for the first dimension. For this reason a movement aligned with the dimension of interest is preferred as it will provide maximum accuracy in the calibration. This means that when a sensing element is shorted by a contact on the sensor then all of the electrical paths created when shorting different sensing elements have the same length and therefore parasitic resistance, which means that the electrical path that bypasses the resistive step has the same length and therefore resistance.

It is preferred for the calibration contact(s) to be placed or moved across the centre of the sensor during calibration. By this it is meant that when calibrating the sensor in a first dimension the calibration contact(s) is/are at the midpoint of a second dimension of the sensor. This means that the parasitic resistance of the shorted electrical paths is the "average" resistance across the full length/width of the second dimension. This technique allows for an "averaging" of any calibration error arising from parasitic resistances.

In a preferred embodiment the, or each, calibration contact acts as an effective point contact, by which is meant that the calibration contact area is smaller than the spacing between the sensing elements. This means that the calibration contact will activate (short) only one sensing element at a time, which can improve the accuracy of the calibration process. It is possible to use a sliding contact having a larger contact area, but this is less preferred due to the limitations that are placed on the measurements that can be taken.

It should be understood that for many sensor designs a continuous measurement of only a single electrical parameter is not used for detecting a contact on the sensor in normal operation. Instead the sensor may operate in a scanning mode, with an alternate electrical signal or excitation being applied to a single resistive element to determine spacing of a contact from opposite ends of the strip and/or in an alternating mode where the loading on two resistive elements for measuring two dimensions (typically orthogonal directions) is alternated to permit effectively simultaneous measurement in both dimensions. This type of 'normal' mode of operation can be incapable of providing the data required for calibration using the method set out above, in particular when a single dimensions is being measured and especially with a sliding contact as the calibration contact.

Hence, preferred embodiments of the method comprise the use of a calibration mode during which the sensor is configured for continuous measurement of the at least one electrical parameter and for recording of the information relating to variation in the electrical parameter. Continuous in this context should be taken to include not only analogue measurement and recording of information but also ongoing digital sampling of one parameter. The calibration mode may prompt the user of the sensor to provide the required moving contact. There may be a time limit for the calibration mode during which time the sensor waits for a calibration contact. If the time limit expires then the sensor preferably returns to its normal mode of operation. The calibration mode may be accessible only during manufacturing or quality control and/or upon initial use of the sensor, or alternatively it may be possible to reinitiate calibration at a later stage, if required by the user.

One possible electrical parameter is a parameter related to the resistance of the resistive element along its length as the calibration contact(s) shorts different impedance steps thereof. The resistance value may be measured as a resistance across the resistive element using a resistance meter, or alternatively a voltage or current may be measured and/or recorded, with the voltage or current arising from an applied known current or voltage, preferably a constant current or voltage, and hence being proportional to resistance. In one preferred embodiment the method comprises recording resistance values relating to the series of impedance steps along the resistive element. The resistance values may be a resistance across the resistive element with one or more impedance steps shorted out, and the method may hence include calculation of the resistance for individual impedance steps based on the measured resistance during calibration and a known total resistance for the resistive element.

In examples of the calibration method for sensors comprising two layers with conductive sensing elements, at least one layer including the sensing elements electrically connected to a resistive element in the form of a resistor strip, wherein a contact on the sensor surface shorts sensing elements at the location of the contact by bringing them into electrical contact with conductive elements on the other layer, the above mentioned measurement of an electrical parameter related to the resistance of the resistor strip along its length may be achieved as follows. A constant voltage may be applied to the resistor strip with a known value resistor provided between the constant voltage source and the resistor strip. When the constant voltage is applied across the known resistor and the resistor strip with a part of this strip shorted by the calibration contact then the resistance of the resistor strip will drop by an amount corresponding to the impedance steps shorted out by the calibration contact. This will increase the current the voltage source will need to supply to maintain the voltage. Measuring the current allows the resistance of the shorted impedance steps to be determined. To measure the current, the voltage drop across the known resistor may be measured. With a known resistance and measured voltage drop, the current can be determined. The total resistance (the sum of the resistance of the known value resistor and the resistor strip) and hence the resistance of the resistor strip can then be calculated. This method may advantageously be combined with the use of a calibration contact of a size that will short only a single impedance step. When such a contact is slid across a number of sensing elements then the impedance steps of the resistor strip will be shorted in turn and information relating to the resistance values may be determined.

One possible electrical parameter may be a voltage or current relating to resistance of a portion of the resistive element extending from one end of the resistor strip to a point on the resistive element corresponding to the location of the calibration contact. The step of assessment of variation in the impedance steps in this instance may include measurement of a voltage or current and determination of the resistance for the impedance steps based on the measured voltage or current and known information about an applied current or voltage. The calibration method may include measurement of a voltage on a wiper electrode for the dimension being calibrated, with a known or preferably constant current being applied to thereby enable variation in resistance values to be determined.

In examples of the calibration method for sensors comprising two layers with conductive elements, at least one layer including the sensing elements electrically connected to a resistive element in the form of a resistor strip, wherein a contact on the sensor surface shorts sensing elements at the location of the contact by bringing them into electrical contact with conductive elements on the other layer, the above mentioned measurement of a voltage or current relating to resistance of a portion of the resistor strip extending from one end of the resistor strip to a point on the resistor strip corresponding to the location of the calibration contact may be achieved as follows. First, a constant voltage is applied across the resistor strip and a high impedance voltage measuring circuit is connected to the other layer. Then, the voltage drop during contact of the calibration contact is measured. This will be the voltage drop over a part of the resistor strip extending from an end of the resistor strip to an edge of the calibration contact. The resistance of this part of the resistor strip can readily be determined from the voltage drop based on the known current applied to the strip. A calibration contact placed at different known locations will allow an average or interpolated value for resistance per impedance step between the edge of the sensor and the known locations or between the known locations to be determined. A calibration contact in moving contact with the sensor area will produce a stepped voltage with each step corresponding to the drop in voltage created by the resistance of each impedance step. Individual impedance steps can therefore be easily determined. In an alternative technique, a constant current may be used in place of the constant voltage, with variations in voltage being used to determine the variations in resistance.

One possible electrical parameter may be related to the resistance of a part of the resistor strip between two contacts. In a simple arrangement of this type the calibration contact(s) may comprise two stationary contacts at different known locations. In this case the calibration method may use measurements of the resistance of the resistive element along its length to determine the impedance steps shorted between the two stationary contacts and measurements of resistance of the portions of the resistive element extending from first and second end of the resistor strip to points on the resistive element corresponding to the location of the first and second stationary calibration contacts using techniques similar to those described above. The calibration contact(s) may alternatively comprise a first contact, which is stationary, and a second contact that moves along a dimension of the sensor or is placed at different locations along the dimension. The second contact shorts different sets of impedance steps of the resistive element to the first contact and a measurement of the resistance across the resistive element, which may use the techniques described above, will provide a resistance of the part of the resistive element not shorted by the two contacts of the calibration contact. A sliding contact for the second contact will result in a resistance that decreases stepwise for as additional impedance steps are shorted. A second contact placed at multiple known locations will provide an electrical parameter that varies in accordance with the total resistance of the impedance steps shorted between the known location and the first contact, thereby enabling an average or interpolated value for these impedance steps to be determined.

Multiple types of measurement may be used in order to provide additional accuracy and redundancy in the calibration method. Thus the different resistance and/or voltage or current measurements above may be used in combination, with more than one of the possible electrical parameters being measured in sequence or repeated calibration contacts or, if possible, simultaneously for a single calibration contact. Any known technique may be applied to measure the electrical parameter.

It will be appreciated that the recorded information need not be a direct indication of the resistance for each impedance steps but instead could include recording of information from which the individual resistances can be derived or estimated. Depending on the operation of the sensor and the control thereof in normal use it may be more convenient to record a parameter in the form of any of one of resistance, conductance, voltage or current values, for individual impedance steps or for groups of steps (for example, as an average value). This might be used to reduce the level of calculation when later use of the calibrated sensor takes the measured and recorded values into account, or to reduce the amount of data that is required to be stored.

The step of recording information may comprise recording a table of the measured electrical parameter and/or of information relating to the resistance for the impedance steps relating to each element of the sensing elements. The table is preferably recorded in electronic form, for example a look-up table in a computer memory of a processor or control circuit. The information stored in the table can be accessed during future use of the sensor and the output of the sensor, i.e. the indications of the location or size of a contact, can be corrected based on the recorded values for the electrical parameter.

The measurements of the electrical parameter may be smoothed before use in later calculations of the resistance for the impedance steps. For example a moving average may be generated and used in conjunction with level detection to identify the steps in the measured parameter relating to the impedance steps when a contact is sliding across the sensing elements.

The area of the sensing elements to be calibrated may be the entire area of the sensor. Alternatively it may be a reduced area, with the results of calibration then being optionally extrapolated to the entire area. Calibration of less than the entire area of a sensor can be quicker but the trade-off is a possible reduction in accuracy.

The method may also include repeated calibration at time intervals during the use of the sensor, for example after a set number of hours of use or with a number of months or years from the last calibration. This allows the calibration process to take into account of any non-uniform degradation of the sensing elements, resistive element and other parts of the electrical circuit that occurs due to age or use of the sensor. For example as an electrical circuit ages metal in the circuit may oxidise or during use flexing of the circuit may result in bending or cracking of elements of the circuit. Factors such as these can result in changes in impedance values and repeating the calibration process will allow such changes to be taken into account. In addition, with a sliding contact if the number of steps detected is fewer than the expected, we can infer that one or more steps have been permanently damaged. As a specific example, if two sensing elements are shorted, e.g. due to silver electromigration or due to a conductive dust particle, then when a sliding calibration contact travels across the two sensing elements, the electrical parameter will have a constant value for twice as long as expected (assuming constant travel speed) before the next step change. If a sensing element is broken, i.e. it is no longer connected to the resistive element, then when a contact travels on top of it, it will not short the resistance step of the resistive element; therefore the sensor output will be unaffected for longer than expected.

The calibration method might typically be used to generate data relating to the impedance steps in order to improve the accuracy of later use of the sensor. The method may also or alternatively be used in quality control, for example to ensure that the variation in resistance of the impedance steps falls below a preset threshold, or to identify unusual measurements indicative of a damaged or broken sensing element. In this context the present threshold would be a variation above which the level of accuracy of the sensor was considered unfit for its intended purpose. It will be understood that checking if the variation in resistance falls below a threshold to ensure high quality is equivalent to checking if the variation in resistance exceeds a threshold to identify low quality products.

As noted above the method of the first and/or third aspect can be advantageously applied to any contact sensor where a contact location and/or area is measured by discrete and spaced apart sensor elements connected by resistive elements, with resistance values relating to impedance steps along the resistive elements being used to determine the sensor elements actuated by the contact. It will be understood that the spacing of the sensor elements is a physical spacing along the sensing surface of the sensor. In preferred embodiments the contact sensor comprises discrete electrical elements formed in an array and arranged to provide a measurable change in electrical properties when there is a contact with a sensing surface of the contact sensor. The contact sensor will typically use a physical/mechanical system where movement of elements of the sensor in response to a contact on the sensor surface results in changes to an electrical circuit within the sensor.

In examples of such a sensor the sensor may comprise a layer with sensing elements in the form of multiple conductive traces located adjacent to further conductive parts and arranged so that a contact on a sensing surface of the sensor completes an electrical circuit involving one or more of the conductive traces and a resistive element, whereby the location and/or area of the contact can be determined by identifying the traces that are involved with reference to the resistive element. To provide a two dimensional measurement system the sensor may include two sets of multiple conductive traces overlaid on one another and at an angle to one another, preferably orthogonal to one another.

The traces may connect to the resistor strip at nominally equal spacing, with the resistance steps hence being the resistance of the resistor strip in the spacing between the points where the traces connect. The proposed method is particularly suited to calibration of sensors using this type of arrangement and can avoid the need for complicated quality control of the manufacturing process to ensure uniform resistance steps. The resistor strip may be divided into impedance steps with a spacing that is equivalent to the spacing of the traces in the sensor array, in which case it may be located physically adjacent to the traces and connect directly thereto.

The advantages of the calibration method apply to any sensor that includes a resistive element with discrete impedance steps. The advantages of the method of operation and correction for parasitic resistance apply to any sensor that uses conductive traces. Either or both method(s) hence may be used with prior art sensors such as the interdigitated arrangements of U.S. Pat. No. 4,587,378 or U.S. Pat. No. 4,963,702. However, in particularly preferred examples the contact sensor comprises: a first insulative layer; a second insulative layer; a first resistor strip on the first insulative layer; a second resistor strip on the second insulative layer; a plurality of first conductive traces provided on the first insulative layer and electrically connected to the first resistor strip; and a plurality of second conductive traces provided on the second insulative layer and electrically connected to the second resistor strip, wherein the first insulative layer and second insulative layer face each other such that the plurality of first conductive traces face the plurality of second conductive traces with each of the first conductive traces extending across the plurality of second conductive traces and each of the second conductive traces extending across the plurality of first conductive traces thereby forming an array of points of intersection of the first and second conductive traces, wherein the first insulative layer and second insulative layer are spaced apart such that there is no electrical contact between the plurality of first and second conductive traces when a contact is not applied to the contact sensor, and wherein when a contact is applied there is an electrical contact between at least one of each of the plurality of first and second conductive traces in a region of the contact. The plurality of first and second conductive traces in this arrangement form the discrete and spaced apart sensor elements.

The method(s) of the first or third aspect can also be applied to sensors with resistive elements in the form of a series of discrete resistors. Although it can be possible to allow for tight tolerances in the uniformity of discrete resistors this may come with significantly increased costs. The calibration method allows resistors of lesser quality to be used without adversely affecting the accuracy of the measurements made by the sensor.

A fourth aspect of the present invention provides a contact sensor apparatus for carrying out the method of the third aspect of the present invention. Thus, the invention provides a contact sensor apparatus comprising an array of discrete and spaced apart sensing elements connected to a resistive element with the location or size of a contact being detectable by measurement of one or more electrical parameter(s) relating to impedance steps along the resistive element; and a processor; wherein the processor is arranged to, in response to one or more calibration contact(s) applied at a plurality of locations across the sensing elements to be calibrated, monitor changes in at least one of the electrical parameter(s) during the time that the calibration contact(s) are applied; and record information relating to variation in the electrical parameter, the information allowing assessment of the variation in each impedance step across the measured sensing elements; thereby enabling the later use of the sensor to take into account any variation in the impedance steps.

In preferred embodiments of the apparatus the processor may be arranged to carry out any or all of the preferred method steps set out above in connection with the third aspect and optionally the first aspect.

The contact sensor apparatus may comprise two layers with conductive elements, at least one layer including the sensing elements electrically connected to the resistive element, wherein a contact on the sensor surface shorts sensing elements at the location of the contact by bringing them into electrical contact with conductive elements on the other layer. In this arrangement the sensor and processor may be configured to measure an electrical parameter in accordance with the above described method(s).

Suitable known electrical circuit and/or processor features may be included in the contact sensor apparatus to enable measurement of the electrical parameter. The step of recording information may consist of recording a table of the measured electrical parameter and/or of information relating to the resistance for the impedance steps relating to each element of the sensing elements. The table is preferably recorded in electronic form, for example a look-up table in a computer memory of the processor.

The apparatus may include a positioning guide to guide the locations or movement of the calibration contact. The positioning guide may for example take the form of a physical pattern or guide for locating a stylus or finger in a given position, or markings on the sensor surface for indicating where a contact should be made. When the sensor is a part of a touch sensitive display then markings may be displayed on the display to direct the user to the required contact locations for the calibration contact(s).

The sensor of the contact sensor apparatus may be a sensor with features as described above in relation to the method of the first aspect. For example, in a particularly preferred embodiment the contact sensor comprises: a first insulative layer; a second insulative layer; a first resistor strip on the first insulative layer; a second resistor strip on the second insulative layer; a plurality of first conductive traces provided on the first insulative layer and electrically connected to the first resistor strip; and a plurality of second conductive traces provided on the second insulative layer and electrically connected to the second resistor strip, wherein the first insulative layer and second insulative layer face each other such that the plurality of first conductive traces face the plurality of second conductive traces with each of the first conductive traces extending across the plurality of second conductive traces and each of the second conductive traces extending across the plurality of first conductive traces thereby forming an array of points of intersection of the first and second conductive traces, wherein the first insulative layer and second insulative layer are spaced apart such that there is no electrical contact between the plurality of first and second conductive traces when a contact is not applied to the contact sensor, and wherein when a contact is applied there is an electrical contact between at least one of each of the plurality of first and second conductive traces in a region of the contact. The plurality of first and second conductive traces in this arrangement form the discrete and spaced apart sensor elements.

In further aspects the invention provides a computer programme product comprising instructions that when executed will configure a contact sensor apparatus and/or a processor of a contact sensor apparatus to perform any or all of the methods described above in connection with the first and/or third aspects and optional features thereof.

An exemplary sensor and certain preferred embodiments of the present invention will now be described in greater detail by way of example only and with reference to the following drawings in which:

FIG. 14b is an enlarged view of a part of the plot of FIG. 14a;

Figure 1:
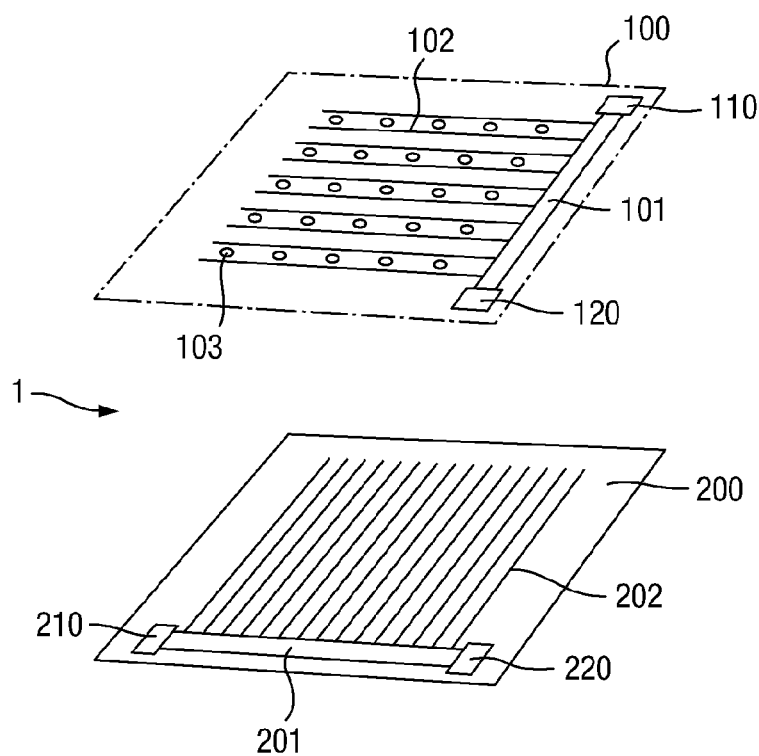
FIG. 1 is a schematic exploded perspective view of a two-dimensional contact sensor having discrete and spaced apart sensor elements.

With reference to FIG. 1, the exemplary contact sensor 1 comprises two electrically insulative flexible layers (substrates). In particular, the contact sensor comprises a first layer 100 and a second layer 200. Each layer 100, 200 carries an array of parallel (or nearly parallel) conductive traces 102, 202, which extend across the layer 100, 200 away from respective resistor strips 101, 201 that form the resistive elements of the sensor. The conductive traces 102, 202 divide the resistor strips 101, 201 into nominally equally sized resistor steps, $R_{step}$ (see FIG. 2b). Thus, $R_{step}$ is the resistance of the resistor strip between two adjacent conductive traces.

The two ends of each of the resistor strips 101, 201 are connected to electrodes 110, 120 and 210, 220 respectively. The electrodes are provided for connection to an electronic circuit.

Figure 2A:
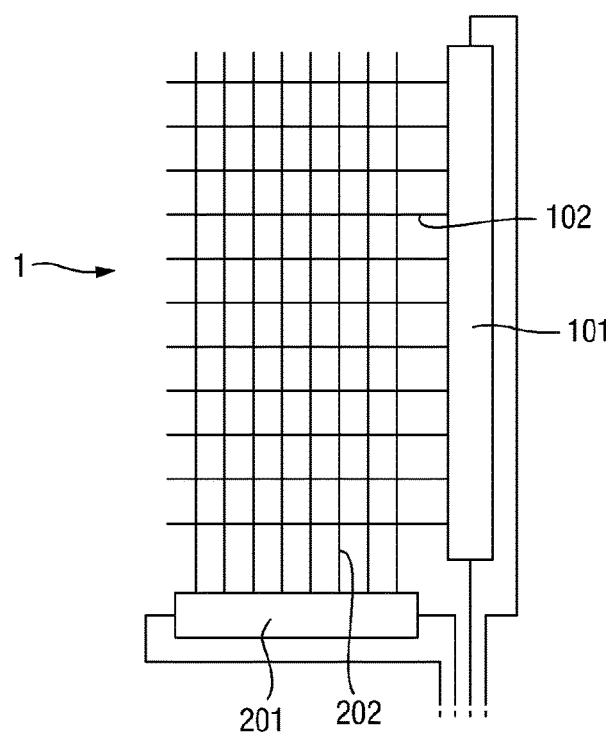
FIG. 2a is a schematic plan view of the contact sensor of FIG. 1.
Figure 2B:
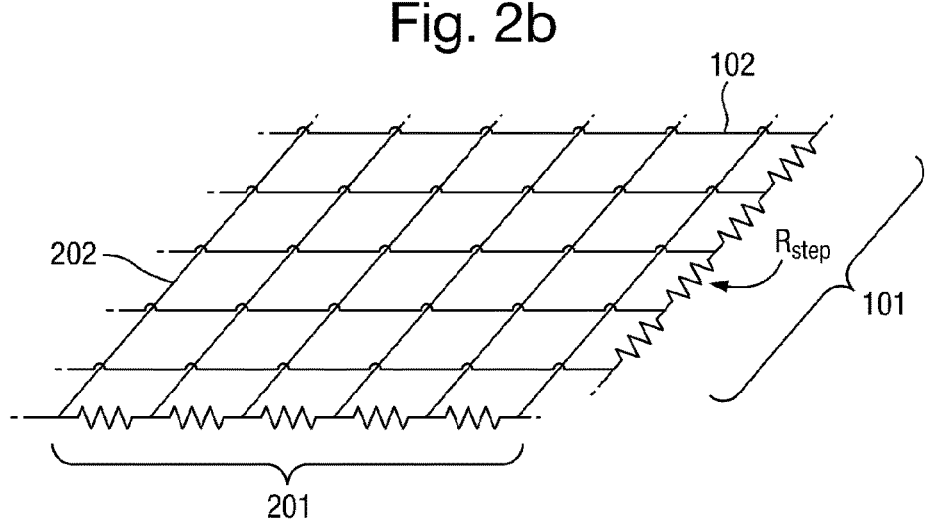
FIG. 2b shows an equivalent electrical circuit of the contact sensor of FIG. 1.

As shown in FIG. 2a, the two layers are assembled together so that the conductive traces 102 on the first layer 100 face the conductive traces 202 on the second layer 200, and the conductive traces on one layer are at an angle to the conductive traces on the other layer. The conductive traces 102, 202 on both layers therefore form an array, or grid, of points of intersection, which forms the sensing area. The equivalent electrical circuit is shown in FIG. 2b.

In order to resiliently space apart the first and second layers 100, 200, a spacer structure 103, in this case spacer dots, can be provided on one or both layers between or on the conductive traces 102, 202 (see FIG. 1). The spacer structure 103 helps the first and second plurality of conductive traces 102, 202 to remain electrically isolated from each other when no contact is applied to the sensor. It is also possible to provide the spacer structure 103 as lines or a pattern around the conductive traces. Features of the spacer structure 103 will affect the threshold of the force needed to make the two layers contact each other. The tighter the spacer pattern 103 and the greater its height, the greater the force needed to register a contact at the points of intersection of the first and second conductive traces. Of course, to keep the two layers 100, 200 separated, the spacer pattern 103 has to be thicker than the depth of the conductive traces 102, 202.

Figure 3A:
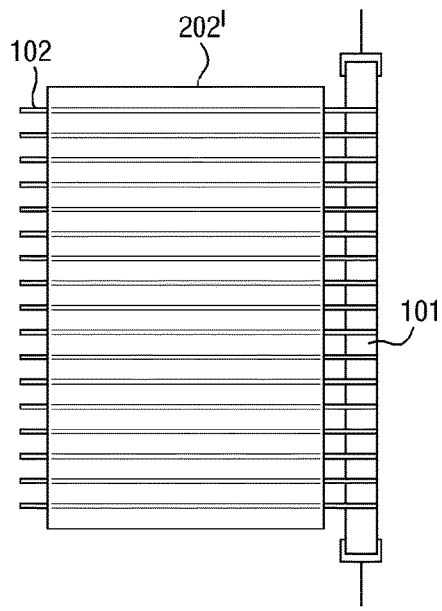
FIG. 3a shows a one-dimensional sensor.

FIG. 3a shows a simplified version of the sensor that can be produced by replacing one half of the sensor with a continuous conductive layer 202', e.g. a metallic foil. When a contact is applied, this layer 202' will short the conductive traces 102 on the other half of the sensor, thereby allowing the measurement of a contact in one dimension only by measuring the change in resistance across the resistor strip 101.

Figure 3B:
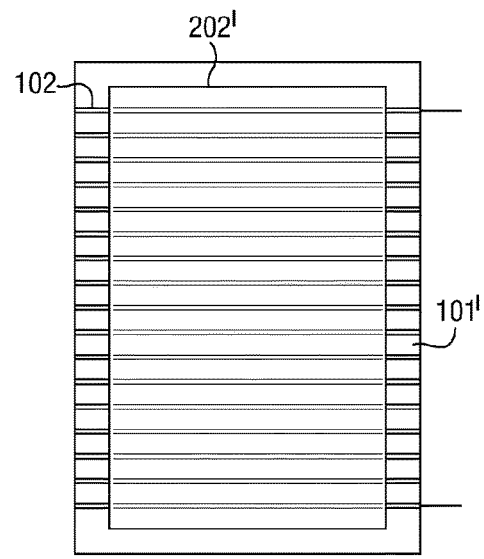
FIG. 3b shows an alternative one-dimensional sensor.

An alternative exemplary one-dimensional sensor is shown in FIG. 3b, which shows a sensor in which the resistive element is provided as a resistor layer 101'. Thus, the resistive element can extend all the way into the sensing area. A benefit of this design is that the sensing area can cover nearly the whole width of the sensor device leaving a very small margin all around for the adhesive and the electrode traces to be routed to the connector. This creates a nearly borderless sensor.

To measure the location/area of the contact in the one-dimensional sensor of FIG. 3a or FIG. 3b, a resistance meter is placed across the ends of the resistor strip 101. When a contact is on the sensor area the change in resistance is related to the length of the contact. For uniform resistance of the resistor strip 101 this change in resistance would be proportional to the contact length. The resistance between the conductive layer 202' and each of the ends of the resistor strip 101 is measured and used to determine the contact length and the contact position.

Figure 4:
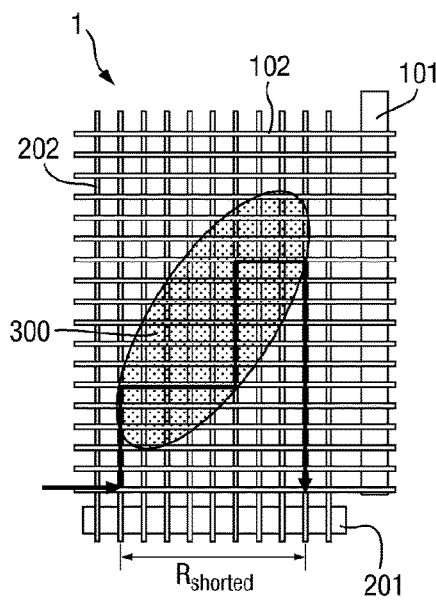
FIG. 4 is a schematic illustrating an example contact sensor similar to the sensor shown in FIG. 1 with a contact applied.
Figure 4:
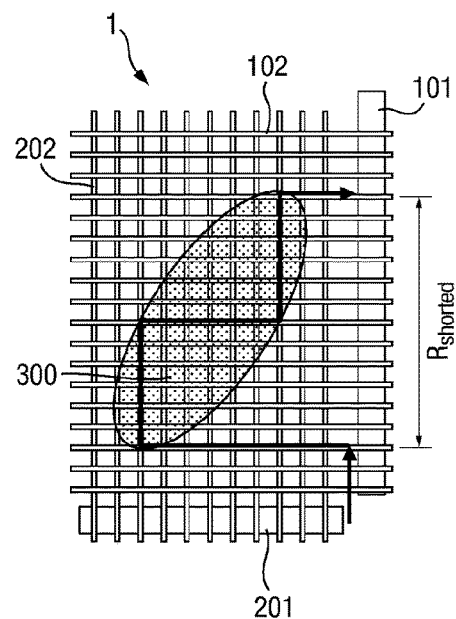

The operation of the two-dimensional sensor of FIGS. 1 and 2 uses a similar principle. FIG. 4 shows a simplified example of a two-dimensional sensor that is similar to that of FIG. 1. As shown in FIG. 4, when a contact 300 is applied to the contact sensor, the conductive traces 102 of the first layer 100 touch the conductive traces 202 of the bottom layer 200 in the region of the contact 300 making an electrical contact. A segment of the resistor strip 101 on the first layer 100 will be shorted by the conductive traces 202 of the second layer. Likewise, a segment of the resistor strip 201 on the second layer will be shorted by the conductive traces 102 of the first layer. The lengths of the shorted segments of the resistor strips 101, 201 correspond to the length and width of the contact 300.

The contact area is defined by the points of intersection at which the contact 300 causes an electrical contact between the first and second plurality of conductive traces 102, 202. As shown in FIG. 4, the contact sensor 1 measures the maximum dimensions projected to their respective resistor strips. In essence, the contact sensor measures the outline of the smallest possible orthogonal that encapsulates the whole contact 300.

There are a number of modes that the contact sensor 1 can be operated in: the resistive mode and the wiper mode. These will be discussed in further detail below with reference to FIGS. 5, 8 and 9. In the preferred embodiments the sensor should be calibrated in accordance with the method discussed below prior to measurements using the resistive or the wiper mode. However, understanding of the calibration method is facilitated by a prior understanding of the measurement modes of the preferred sensor and therefore these are discussed first.

Resistive Mode

In the resistive mode, it is possible to measure the size, but not the location, of the contact 300. It will be understood that it is necessary to know the location of the contact 300 in order to take fully advantage of the calibrated values for the resistor steps along the resistor strips 101, 201, which may vary with location. Therefore, the resistive mode in combination with calibrated values requires either that the contact area location is known, for example by requiring that the contact be placed against an end plate on the sensor area, or that the contact area is measured as well, for example by the wiper mode.

However, even without knowing or being able to measure the contact area location the information provided by resistive mode can be improved by use of the calibrated values. For example, a statistical analysis of the variation of the resistor step resistances from a mean resistance will allow determination of an estimated confidence interval for measurements of the size of a contact area by the method below.

When a contact 300 is applied to the contact sensor 1, the change in the resistance of the resistor strips 101, 201 will be a monotonic function, usually a near-linear function, of the contact length and width as projected to the corresponding resistor strip 101, 201. One of the resistor strips 101 determines one of the dimensions of the contact 300 (length or width) and the other resistor strip 201 determines the other dimension. When the resistance of one of the two strips is measured, the other strip needs to be electrically isolated so that it does not introduce any parasitic voltages/currents to the first strip, which can affect the measured resistance.

For each resistor strip:

$$R_{CONTACT} = \rho \frac{Length_{TOTAL} - Length_{CONTACT}}{wt} = k(Length_{TOTAL} - Length_{CONTACT}) \quad (1)$$

$R_{CONTACT}$ is the resistance of the resistor strip 101, 201 after a contact is made, $\rho$ is the resistivity of the resistor strip, $Length_{TOTAL}$ is physical length of the resistor strip in question, $Length_{CONTACT}$ is the length or width of contact area 300, w is the resistor strip's width, t is the resistor's thickness and $k=\rho/wt$.

The factor k may vary due to manufacturing tolerances of the resistor strip's resistivity $\rho$ and thickness t. It is preferred to use calibrated values generated as discussed below to give greatest accuracy, but for a simple operation in the resistive mode the contact sensor 1 can be self-calibrated by using the following ratio approach:

$$R_{TOTAL} = k(Length_{TOTAL}) \quad (2)$$

where $R_{TOTAL}$ is the total resistance of the resistor strip 101, 201 in question, i.e. without a contact applied.

$$\frac{R_{CONTACT}}{R_{TOTAL}} = \frac{Length_{TOTAL} - Length_{CONTACT}}{Length_{TOTAL}} \quad (3)$$

and therefore:

$$Length_{CONTACT} = Length_{TOTAL}\left(1 - \frac{R_{CONTACT}}{R_{TOTAL}}\right) \quad (4)$$

$Length_{TOTAL}$ is known (per the manufacturing specs). Therefore, measuring the pre-load initial resistance ($R_{TOTAL}$) of the resistor strip 101, 201 and its resistance when a contact 300 is applied, the contact length ($Length_{CONTACT}$) of the contact 300 can be calculated.

It is apparent that the contact sensor 1 is self-calibrated since the contact length/width measurements are based on the ratio of the resistance values before and after the contact 300 is applied. This is very useful when the initial resistance of the strip 101, 201 can vary due to manufacturing tolerances, varying ambient conditions such as temperature and humidity, ageing and so on. The contact sensor 1 is therefore immune to the precision and/or stability of the resistor strip 101, 201, which reduces the manufacturing cost and increases the contact sensor's accuracy.

It is likely that the resistance of the discrete steps ($R_{step}$) can be affected by environmental changes such as temperature or humidity, or by ageing, etc. Nonetheless, as long as the effect is not localized, all steps will change similarly along with the total resistance of each strip 101, 201. Since all measurements capture the relative change in resistance, the contact sensor 1 is intrinsically immune to the effects of these variables.

The resistance can be measured with different circuits, e.g. voltage divider, resistance to voltage op-amp converter, resistance to frequency converter such as the 555 timer or a square wave relaxation oscillator, etc. For reasons of accuracy and simplicity a constant current source was used to apply a constant current to one resistor strip 101, 201 at a time. The longer the segment of the resistor strip that is shorted, the smaller the total resistance; therefore, the measured voltage will be lower as well, given that the current is constant.

Therefore:

$$V_{TOTAL} = IR_{TOTAL} \quad (5)$$

$$V_{CONTACT} = IR_{CONTACT} \quad (6)$$

$$\frac{V_{CONTACT}}{V_{TOTAL}} = \frac{R_{CONTACT}}{R_{TOTAL}} \quad (7)$$

Substituting the above ratio in Equation (4):

$$Length_{CONTACT} = Length_{TOTAL}\left(1 - \frac{V_{CONTACT}}{V_{TOTAL}}\right) \quad (8)$$

Figure 5:
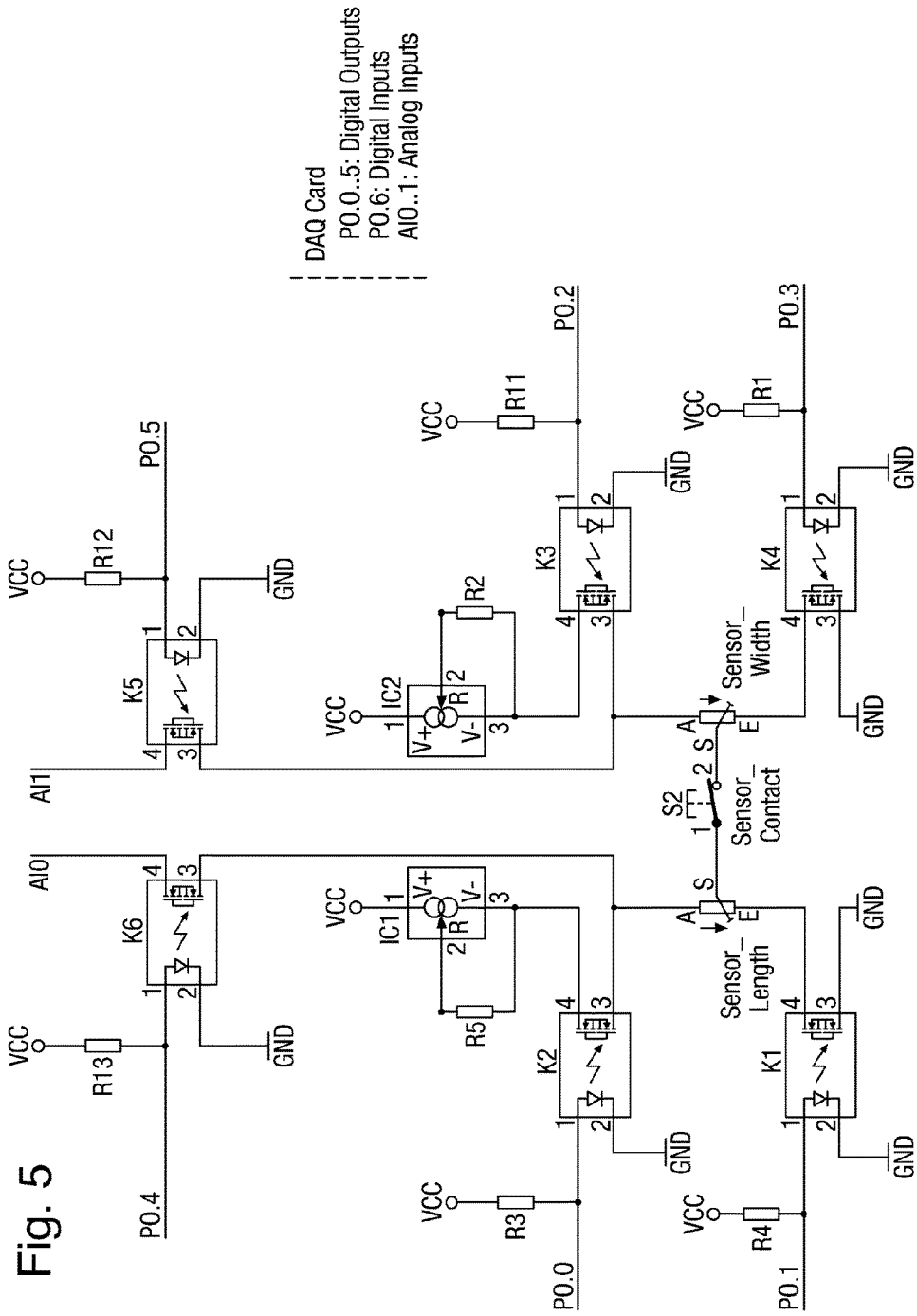
FIG. 5 shows a circuit design for the exemplary contact sensor.

Referring to FIG. 5, when the relays K1 and K2 are on, one end of the one of the resistor strips 101 is attached to a Constant Current Source (CCS) and the other end is grounded. Relay K6 is then turned on to connect the output of the CCS to an Analog to Digital Converter (Data Acquisition Card). The voltage measured is directly proportional to the resistance of the resistor strip 101. The other resistor strip 201 is floating; therefore it does not introduce any parasitic voltages to the resistor strip 101 being measured.

To measure the other resistor strip 201, K1 and K2 are turned off and K3 and K4 are turned on. K5 is turned on and the voltage at the output of the second CCS is captured by a second analog input on the DAQ card.

There is an alternative method that can be applied when the calibration finds that all of the resistor steps are the same, to within a predefined tolerance. In such a resistor strip 101, 201, all resistor steps $R_{step}$ can be assumed to have the same value with a high degree of confidence due to the confirmation provided by the calibration of the sensor. In this case, when a contact short-circuits n resistor steps, the reduction of the strip's resistance will be $nR_{step}$. By measuring the drop in the resistance, the length of the contact 300 (in either direction) can be easily calculated as follows:

$$R_{TOTAL} - R_{CONTACT} = nR_{step} \Rightarrow n = \frac{R_{TOTAL} - R_{CONTACT}}{R_{step}} \quad (9)$$

Given that the contact sensor resolution is known (resolution in this example being measured as the conductive trace pitch), the contact length can be calculated:

$$Length_{CONTACT} = n \times resolution \quad (10)$$

Parasitic Resistance

Figure 6:
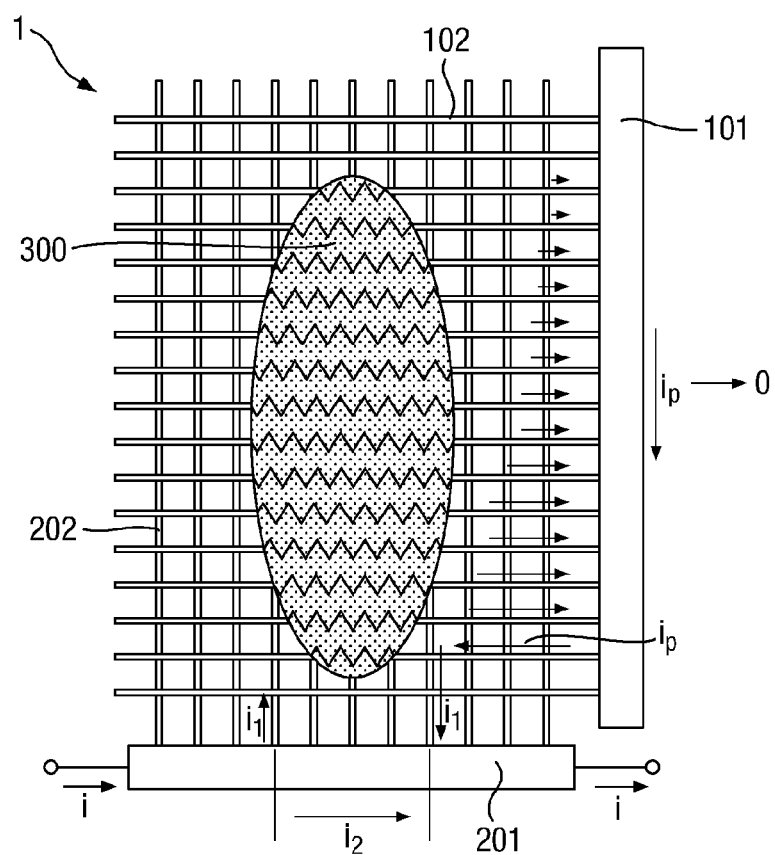
FIG. 6 shows the currents that flow when a contact is applied to the contact sensor of FIG. 4.

Referring to FIG. 6, when part of a resistor strip 101, 201 is shorted, some current $i_1$ will flow through the shorting conductive traces 202, some current $i_2$ will flow through the shorted portion of the resistor strip 201 and some current $i_p$ will flow through a segment of the other resistor strip 101.

The conductive traces 102, 202 should have a very low resistance in comparison to the resistance of the resistor strips 101, 201; therefore most of the current will flow through the shorting conductive traces. In fact, the greater the length of the contact area, the smaller the parallel resistance of all the shorting conductive traces and the lower the parasitic currents from the furthest steps of the strip on the other half, i.e. the steps furthest from the other of the two resistor strips. Therefore, $$i_1 >> i_2, i_p \quad (11)$$

Assuming the contact 300 is wide enough to short only two conductive traces 202 in one dimension, the equivalent electrical circuit (shown in FIG. 7) will consist of segments $R_1$ and $R_2$ of the resistor strip 201, the shorted resistance $R_{shorted}$ of the resistor strip 201, the resistance of the conductive trace $R_{trace}$ and the contact resistance $R_{contact}$ between the conductive traces at the points of intersection.

Figure 7:
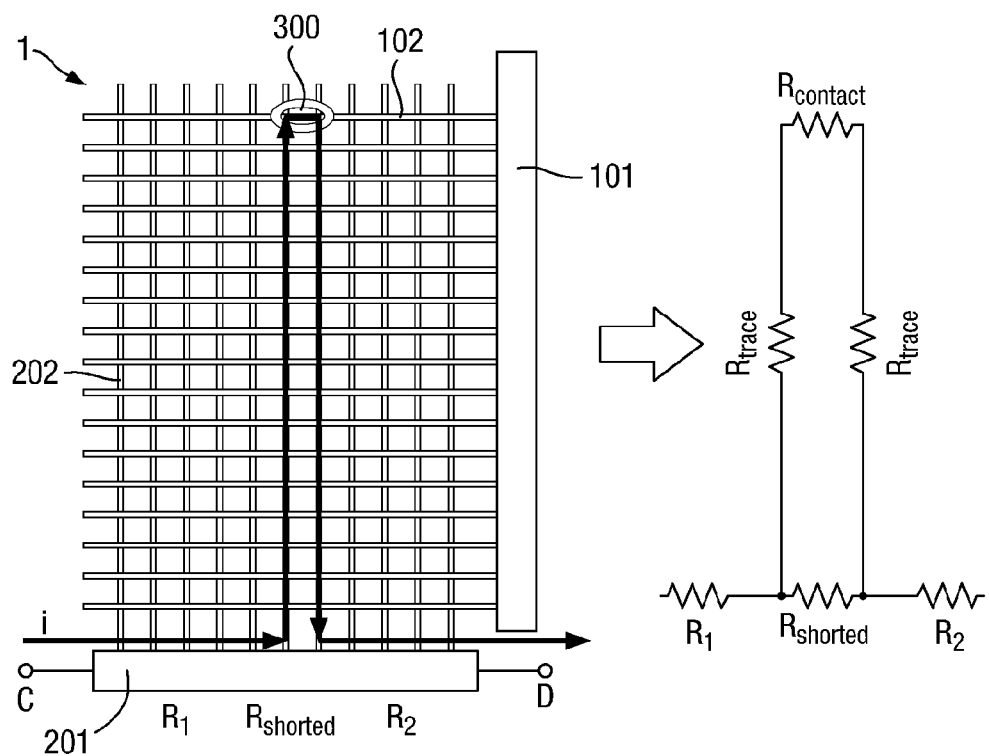
FIG. 7 shows the equivalent circuit for the sensor of FIG. 4 when a small contact is applied that only shorts one resistance step along one of the resistor strips.

Thus the total resistance between points C and D shown in FIG. 7 is:

$$R_{CD} = R_1 + R_2 + \frac{(2R_{trace} + R_{contact})R_{shorted}}{(2R_{trace} + R_{contact}) + R_{shorted}} \quad (12)$$

The last term in Equation (12) represents the parasitic resistance.

Assuming $R_{contact}$ is negligible and $R_{shorted}$ is substantial (i.e. more than one step), the total resistance measured can be simplified to:

$$R_{CD} = R_1 + 2R_{trace} + R_2 \quad (13)$$

The value of $R_{trace}$ will depend on the location of the contact, i.e. the longer the distance from the width resistor strip, the longer the trace and the greater the parasitic resistance added to the measured $R_{CD}$. The effect of $R_{trace}$ can become substantial when the conductive traces need to be very narrow in width (for example, in high resolution sensors) or less conductive (for example to reduce manufacturing costs by using a material with fewer expensive conductive particles such as silver, or by printing thinner layers). In such cases, $R_{trace}$ will introduce a large error in the calculation of the number of shorted steps. It hence becomes desirable to compensate for the 'parasitic' resistance introduced by $R_{trace}$.

To compensate for $R_{trace}$, the wiper mode (discussed in detail below) is used to detect the distance of the contact area from the resistor strip. This distance can be used to estimate $R_{trace}$ as follows:

$$R_{trace} = R_{trace\_max} \frac{Distance}{Max\_Length} \quad (14)$$

Here, Distance is the distance along the trace of the edge of the contact area 300 from the width resistive strip 201, since the width resistor strip 201 is being used for the measurement of the contact's position across the length resistor strip. This distance is also referenced herein as length l. $R_{trace\_max}$ is the total trace resistance between the two ends of the trace and Max_Length is the physical length of the conductive trace, which is also referenced herein as length L.

Max_Length of the conductive trace is known and constant, and is characteristic of a given sensor's design. $R_{trace\_max}$ can be measured in advance or it can be calculated based on the conductive material's conductivity and the trace's geometry. In a well-controlled manufacturing environment, this resistance is expected to be fairly consistent; therefore it does not have to be measured frequently.

As described below, with reference to FIG. 8, the wiper mode can be used to determine a value for $R_2$ (which in FIG.

Figure 8:
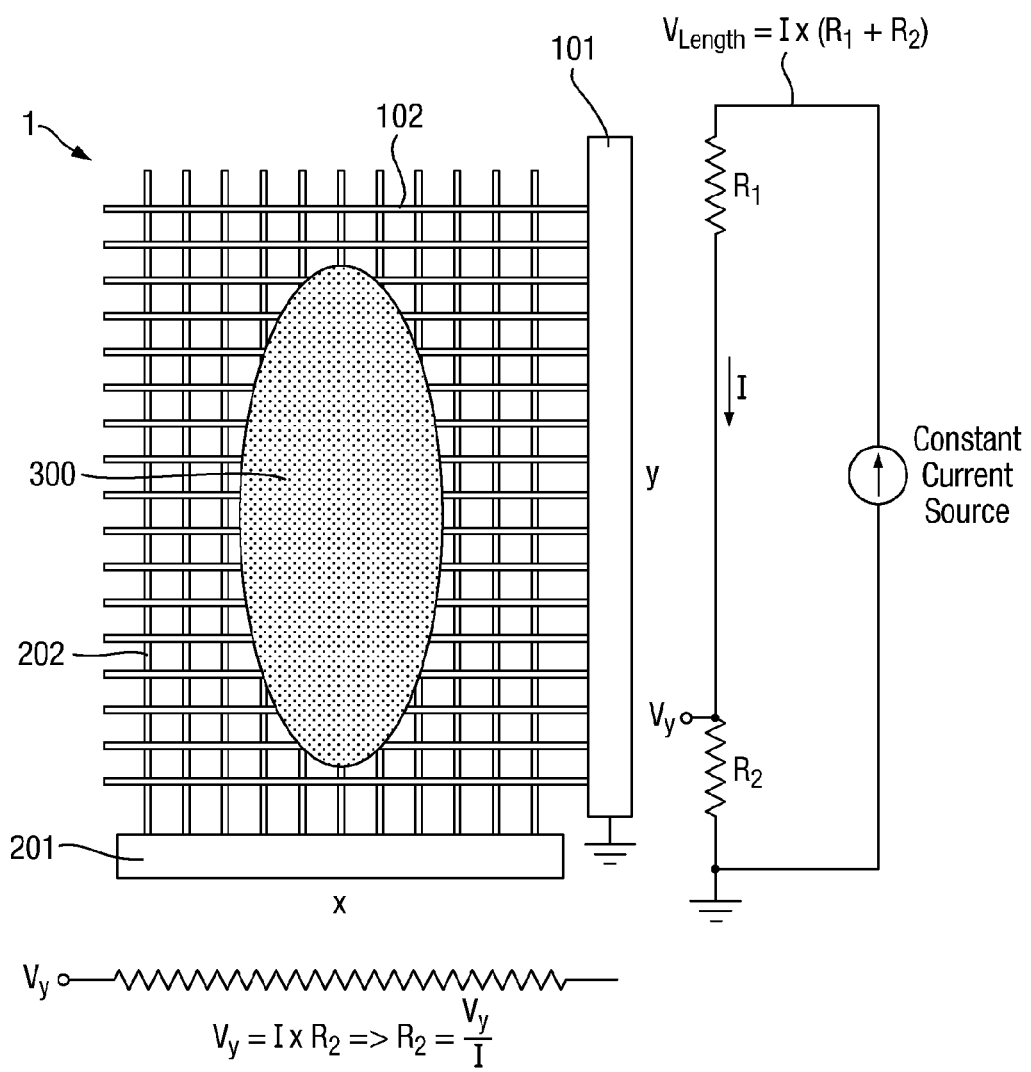
FIG. 8 shows measurement of the contact length and position in one dimension for the sensor of FIG. 4.

8 concerns position on the length resistor strip 101) and therefore to find the location of the contact 300 along the length resistor strip 101, which, as shown in FIG. 8 is the distance of the contact 300 from the width resistor strip 201. Similarly the Distance (length l) of contact 300 from the length resistor strip 101 can be determined by use of the wiper method with a constant current source across the width resistor strip 201. Thus, the wiper method, taking measurements using the orthogonal resistor strip, can determine the length l along the trace from the contact 300 to the resistor strip of interest.

Based on measurement using the wiper mode, the trace resistance can be estimated using Equation (14). Therefore, this trace resistance can be subtracted from the total measured resistance $R_{CD}$ (Equation (13)) to eliminate the error it introduces in the calculation of the actual number of steps shorted.

With the above method, extremely narrow and/or long traces can be used whose resistance will not affect the accuracy of the sensor. Such traces may be needed to create a high resolution sensor and/or very large area sensors. Alternatively, highly conductive but expensive trace materials can be replaced with more resistive but low cost alternatives such as silver/carbon blends, or even purely resistive materials such as carbon filled inks or conductive yarns used in electronic fabrics.

It will be noted that the example in FIG. 7 concerns a contact 300 spanning just two traces. It should be understood that the same technique can also be used in the case of a contact 300 spanning more than two conductive traces. When the contact shorts more than two traces then $R_{contact}$ will increase due to the parasitic resistance of the electrode trace between the contact points. However, when all the traces between the outer two points of the contact area 300 are shorted then multiple parasitic currents will flow from the width resistor strip 201 to the shorted traces under the contact area 300. This means that the total $R_{contact}$ should become smaller. Further, as soon as the contact also spans across multiple traces in the length direction, then we have multiple $R_{contacts}$ (electrode trace lengths) connected in parallel, as shown in FIG. 6, hence their combined resistance will be very low and $R_{shorted}$ will effectively be shorted. So, in principle, the greater the number of shorted traces is (in both dimensions), the more accurate the method becomes.

With the appropriate scanning method (referred to herein as the wiper mode), the sensor can be used to measure both the contact area and the position of the contact area on the sensor.

Wiper Mode

The size of the contact 300 can be calculated based on the resistance measurements of the two resistor strips 101, 201, as outlined above. The wiper mode allows the location of the contact 300 to be found.

Figure 9:
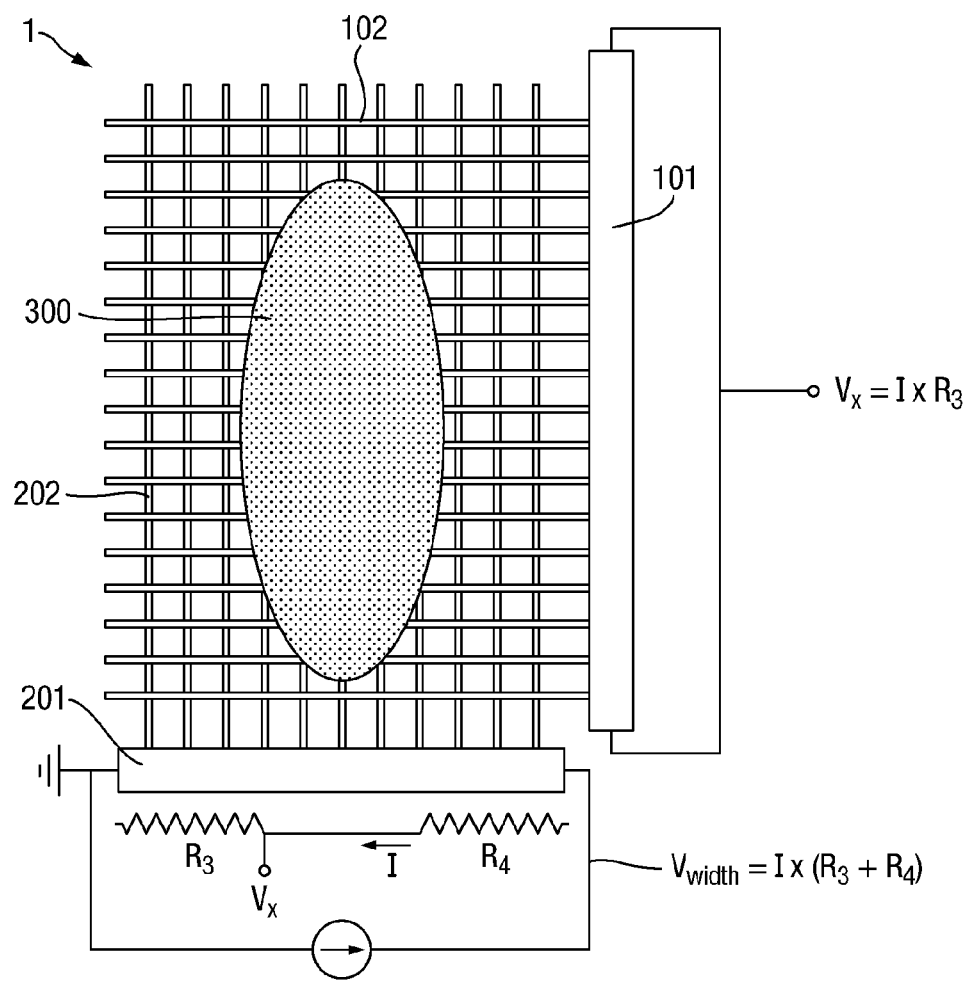
FIG. 9 shows measurement of the contact length and position in the other dimension for the sensor of FIG. 4.

Referring to FIGS. 8 and 9, as an example, consider finding the location of the contact along the first resistor strip 101. Whilst constant current I is supplied by the constant current source across the first resistor strip 101, a high impedance voltage measuring circuit can be attached to any part of the resistor/conductive trace pattern on the second layer 200. The second layer acts as a wiper electrode to identify the location of the contact across the first resistor strip 101.

Specifically, to measure the voltage drop $V_y$ across resistor $R_2$:

$$V_y = IR_2 \Rightarrow R_2 = \frac{V_y}{I} \quad (15)$$

Therefore, $$\frac{V_y}{V_{TOTAL}} = \frac{R_2}{R_{TOTAL}} = \frac{Length_{END}}{Length_{TOTAL}} \quad (16)$$

where $Length_{END}$ is the distance of the end of the contact area from the end of the resistor strip 101 and $V_{TOTAL}$ is the voltage drop across the resistor strip when unloaded.

The circuit described above in relation to the resistive mode (see FIG. 5) can also be used in the wiper mode. Specifically, when the first resistor strip 101 is being measured (K1=K2=K6=On), the conductive traces 202 on the other sensor layer 200 can be connected to the $2^{nd}$ ADC and capture the voltage drop between the end of the contact on the first resistor strip 101 and its ground. Specifically, K3=K4=Off but K5=On. Since the input of the ADC is a high impedance one, this connection draws very little, if any, current. Therefore, it does not affect the resistance measurement of the first resistor strip 101. Reversing the process, the circuit can then measure the voltage drop between the end of the contact 300 in the second resistor strip 201 and its ground. In essence, there are two voltage measurements per strip, one for the resistance and one for the position of the contact across its respective dimension. Hence, both the area of the contact 300 and its position can be determined.

The size of the contact 300 can also be measured using the wiper method (instead of the resistance method discussed above). Specifically, $V_y$ measured resistance $R_2$. By reversing the current flow on the Length resistor, $V_y$ will measure the voltage drop across resistor $R_1$, therefore $R_1$ can be measured as well. From this information, the length of the contact itself can be calculated. Also, if $V_{CONTACT}$ and one of $R_1$ or $R_2$ are known, then the other resistance (other end of contact) can be determined using Equation (6).

It will be appreciated that the determination of these resistance values leads directly to knowledge of the number of resistor steps along the resistance strips, if it is acceptable to assume that the resistance of each of the resistor steps is the same. In some cases, for example with a very tightly controlled manufacturing process and/or a sensor with larger spacing between the sensing elements using larger resistance values then this may be a reasonable assumption. However, this is not always the case especially for sensor with smaller spacing between the sensing elements and also sensors that are large and/or low profile (thin). It is therefore important to investigate the potential effects of variations or non-uniformity in the resistor steps.

Non-Uniformity as a Source of Error

As noted above, in prior art methods the resistive steps formed by the parallel electrodes crossing each resistor strip are assumed to have a relatively similar resistance. If these steps are uneven, then it will no longer be possible to assume that the measured Length or Width resistance will be proportional to the shorted Width or Length of the respective resistor strips, in which case Equations (1) to (4) are no longer accurate.

Figure 10A:
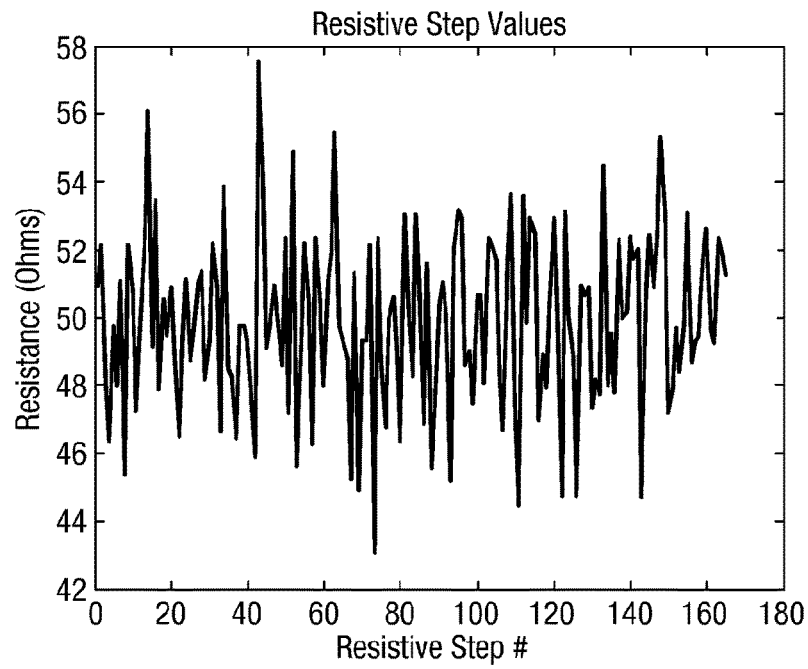
FIGS. 10a to 10c illustrate a simulated random variation in the uniformity of resistance steps and resulting measurement errors that may occur.
Figure 10B:
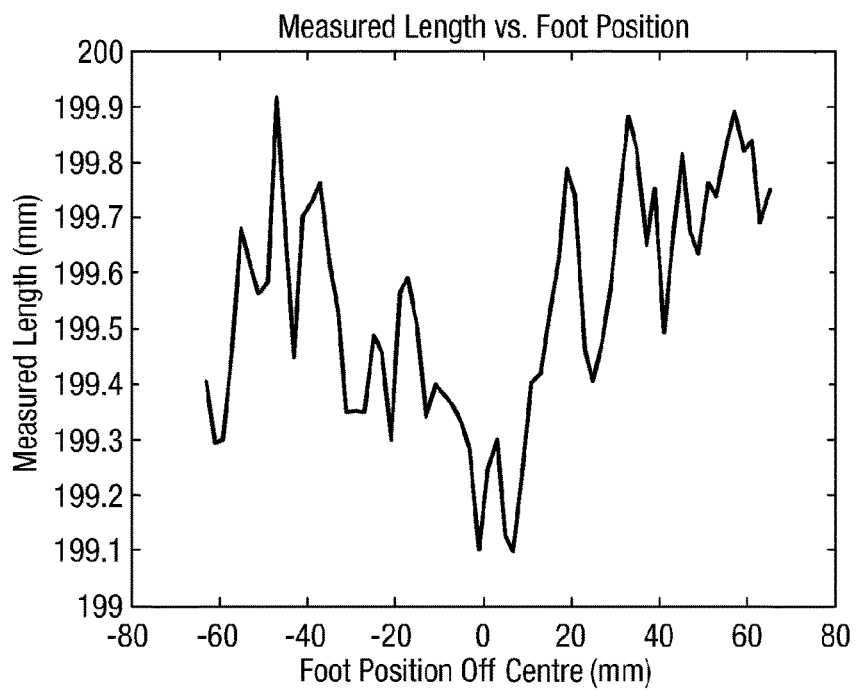
Figure 10C:
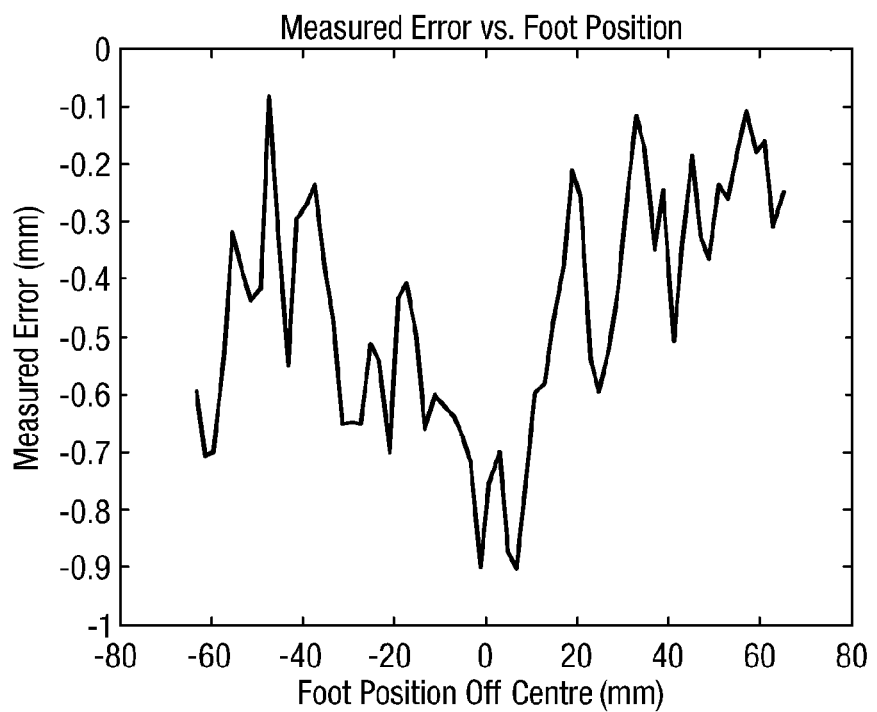

This is illustrated in FIGS. 10a to 10c by a simulation of the effects on measurement accuracy if the resistance of the resistive steps has a random variation following the normal distribution. FIG. 10a shows a simulated random variation of this type, with the horizontal axis indicating the steps along the resistor strip for one dimension (101, 201, for example) from the first trace to the last trace for an example sensor with 165 traces and a spacing between the sensing elements (resolution) of 2 mm (giving a total length of 330 mm). The average resistance was set as 50 Ohms and the standard deviation at ±2.5 Ohms, or ±5%. In this simulated random variation, the number of steps that have a resistance greater than the average will be about equal to the number of steps that have a resistance lower than the average. In principle therefore, when the resistance of the loaded sensor is measured across a reasonable number of sensing elements then the variation of the un-shorted resistive steps will cancel each other out and the final measurement will still be reasonably accurate, most of the time. The errors are however not insignificant.

The example is described in the context of a sensor for measuring the size of a foot. It will be understood that it applies equally well to any other source for the contact on the sensor surface. Assuming the foot makes a 200 mm long contact on a 330 mm long sensor with a 2 mm spatial resolution, the contact length measured should be 200 mm. FIG. 10*b* shows a simulation of the effect of the random variation of FIG. 10*a*. The resulting sensor measurement is illustrated as a function of the distance of the foot's contact area from the centre of the sensor. A value of 0 mm off centre indicates that the centre of the foot coincides with the centre of the sensor.

In FIG. 10*b* the simulation sums the resistance of all of the resistance steps of FIG. 10*a* that are within the 200 mm length of the foot. This value is then used as $R_{CONTACT}$ in Equation (4). The total resistance of all 165 resistance steps is used as $R_{TOTAL}$ to thereby calculate the contact lengths shown in FIG. 10*b*. The corresponding deviation from the ideal 200 mm output is shown in FIG. 10*c*. It will be understood that when the resulting error is smaller than the sensor's spatial resolution, then the effect of uneven resistive steps is insignificant. However, if the variation in resistance is greater or if there are outliers with unusually high or low resistance values then the error can create significant problems.

In general, the greater the variation in resistance, the greater the possibility for larger errors. That is because the sum of the un-shorted resistive steps can vary more from the theoretical ideal sum (all resistive steps being of equal resistance). In addition, the fewer steps that are shorted or left un-shorted the greater the chance for larger measurement errors since the sum of these steps can vary more from the ideal. There is hence a significant need to be able to quantify the variation in resistance and to take account of this variation when making measurements using the sensor.

Figure 11A:
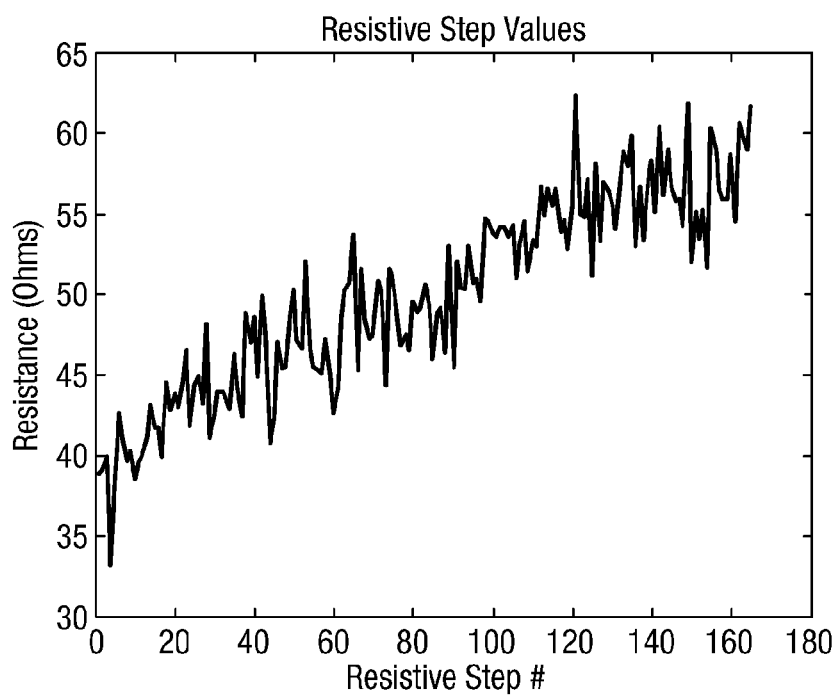
FIGS. 11a to 11c show the effects of the random variation of FIGS. 10a to 10c when combined with a linear variation in resistance.
Figure 11B:
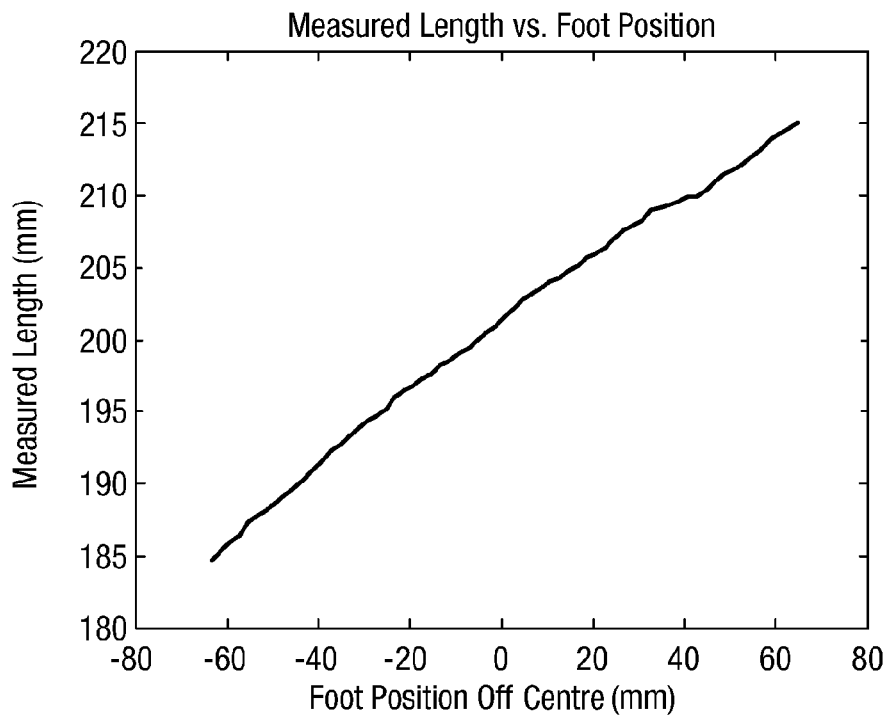
Figure 11C:
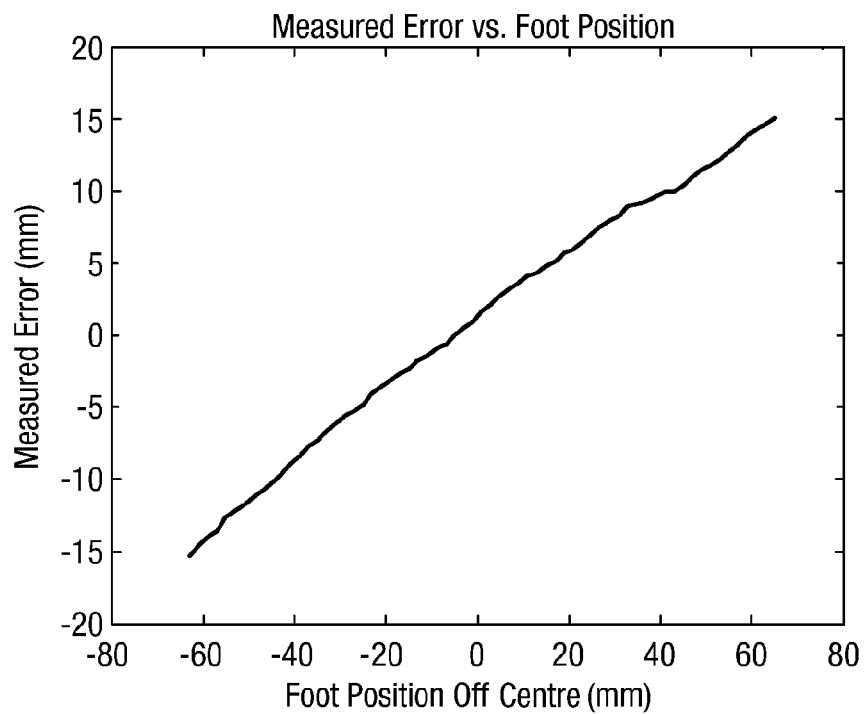

Furthermore, with some manufacturing methods, the values of the resistive steps may have a trend, e.g. the first step has a resistance of 60 Ohms and the last one a resistance of 40 Ohms. This is not uncommon in poorly set up screen printing manufacturing lines. In this case, the sensor measurements can have large errors as illustrated in FIGS. 11*a* to 11*c*. FIG. 11*a* illustrates a random variation as in FIG. 10*a* with the addition of a 20 Ohm variation from one end of the sensor to the other. As can be seen from FIGS. 11*b* and 11*c*, which show the measured length and error using a similar calculation to that described above in relation to FIGS. 10*b* and 10*c*, the error compared to the actual length of 200 mm is significant and it is larger than the spatial resolution of the sensor. This type of error is not acceptable.

It will be understood that the references above to a foot as the source of the contact on the sensor are for example only, and the same issues apply equally to any other sensor type, with any source for the contact area.

Calibration Method

There is a clear problem to address. In the prior art steps are taken to ensure that the sensors are manufactured with uniform resistance steps. It is proposed herein to use a calibration of the sensor, which provides greater accuracy than improvements in manufacturing, and with fewer constraints on manufacturing efficiency, sensor design and cost.

In the proposed calibration method the sensor can have a calibration mode where it monitors one or more electrical parameter(s) relating to the shorted resistance steps (for example the voltage in wiper mode or resistive mode). A calibration contact is made on the sensor surface and the electrical parameter(s) of interest are measured during this calibration contact. In addition, the parasitic trace resistance may also be compensated for during calibration and/or during later use of the sensor by using the method discussed above. In particular, the parasitic trace resistance can be subtracted from the total measured resistance to eliminate the error it introduces in the calculation of the actual number of steps shorted.

In a simple example this calibration contact could be a contact point placed at several different known locations across a dimension of the sensor, with the electrical parameter then indicating any variation in the summed impedance steps for the sensing elements between these locations. A rule or a positioning guide of some other type can be used to ensure that the calibration contact was made in the right/known locations. Since the locations are known then the mean average for the resistive steps at each sensing element between the contact locations can be calculated. A rough calibration of the sensing elements can hence be made. This will identify any major variations along with any linear trends. The accuracy and resolution of the calibration can be increased by adding more contact points at closer spaced locations. The values of the resistive steps can be stored as a table for later use when measuring a contact area and/or location using the sensor.

A still simpler method could use multiple stationary contacts at known locations along with measurements to determine the resistance of parts of the resistive element relating to the sensing elements between the multiple contact locations and between those locations and edges of the sensor. For the example sensor discussed herein this could involve two contact points with the resistive mode being used to determine the resistance for the part of the resistor strip between the two contacts and the wiper mode being used to determine the resistance for the parts of the resistor strip between the contact and an adjacent edge of the sensor array. This information would then allow an average value for the impedance steps in those parts of the sensing array to be determined. These averages could be used in later calibrated measurements made by the sensor, or they could be interpolated to find an assumed linear or non-linear trend in resistance steps along the resistor strip.

In cases where the resistor strips have a very uneven resistance with and/or a compound trend, a more rigorous calibration is needed. A more rigorous calibration is also of benefit where the sensor element spacing is small, since in this case even small variations in absolute resistance values will have a large impact in the sensor's accuracy.

Ideally, the resistance of each resistive step needs to be measured and stored in a table. If these values are known, then it will then be straightforward to take accurate length/width measurements even if there is a significant variation.

Figure 12A:
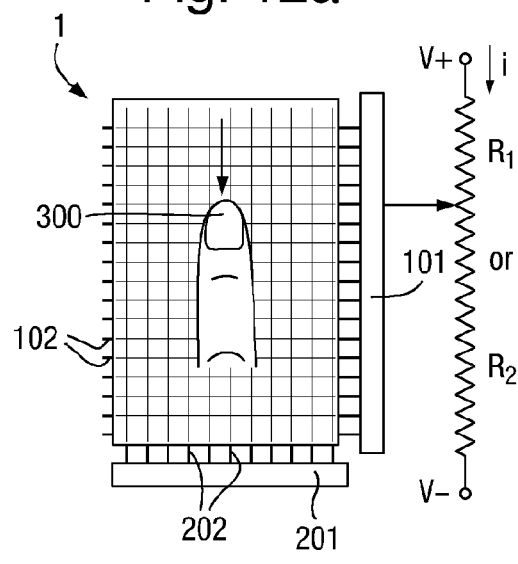
FIGS. 12a and 12b show movement of a contact that can be used in an example of a calibration method for a sensor as shown in FIG. 1.
Figure 12B:
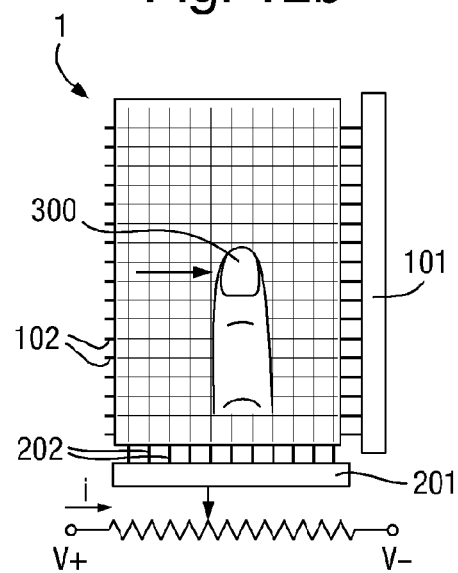

The preferred method uses a moving sliding calibration contact and a continuous monitoring of an electrical parameter relating to the resistance steps. An example is shown in FIGS. 12a and 12b for the sensor described above. A contact 300, which is a finger in this example, is drawn across the length of the sensor, traversing the sensing elements 102. The "wiper" electrode (Width) can measure the voltage drop across the first resistive step of the resistor strip 101, then the sum of the first and second steps, then the sum of the first, second and third steps, and so on by means of Equation (15). Likewise, the same calibration contact can be drawn across the Width of the sensor (left to right, or right to left) and the corresponding "wiper" electrode (Length) will pick up the voltage drop across the traveled distance of the second resistor strip 201 as successive traces 202 are shorted.

Figure 13:
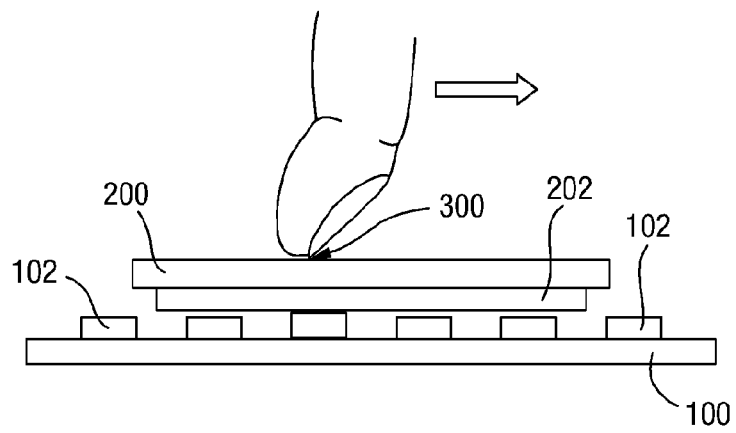
FIG. 13 shows the use of a moving point contact with a cross-section of a sensor of the type shown in FIG. 1.

For best results the calibration contact area from the calibration contact 300 should be small and so a fingertip or a stylus is preferred. If the calibration contact area can be made smaller than the spacing between the sensing elements then it is effectively a point contact and it can be ensured that only a single trace is shorted at any one time. FIG. 13 illustrates a side view of a fingernail being used to create a small calibration contact 300 on the sensing surface, thereby shorting only one of the sensing elements 102 on a lower layer 100 with the sensing element 202 on an upper layer.

Figure 14A:
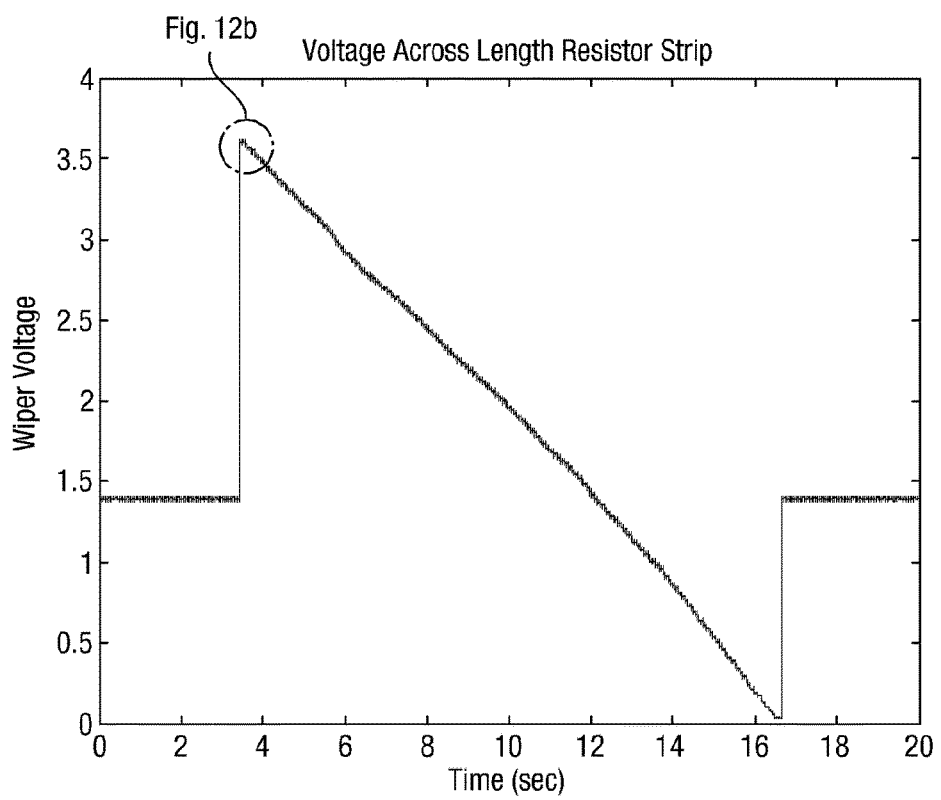
FIG. 14a is a plot of variation of measured voltage across a length resistor strip when there is a moving contact along a length of a sensor.
Figure 14B:
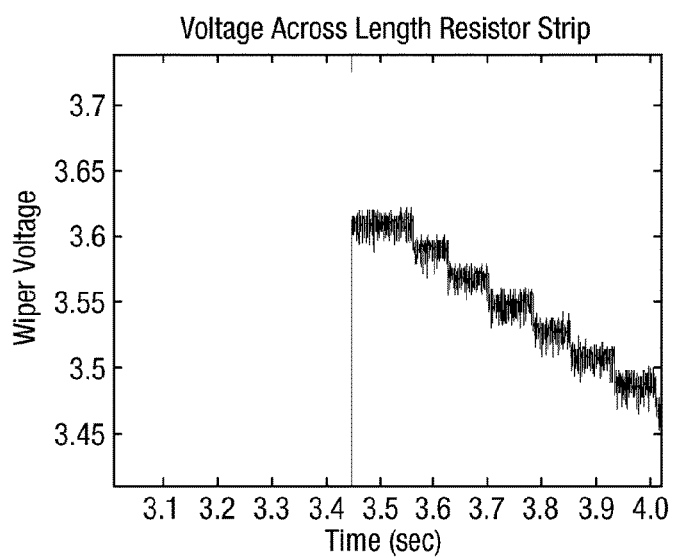

The results of this measurement along the length of an example sensor with a large number of sensing elements is shown in FIGS. 14a and 14b. FIG. 14a shows the voltage across the "wiper" electrode while the nail of a fingertip was drawn across the Length and the wiper voltage was sampled. FIG. 14b shows an enlarged view of a portion of the graph of FIG. 14a. As the finger traverses each trace the voltage drops down by a step that is proportional to the resistance of the impedance step on the resistor strip. By measuring the voltage drop $\Delta V_i$ across each step i, the step resistance $R_i$ can be calculated per:

$$\Delta V_i = I R_i \quad (17)$$

where I is a constant current applied to the resistor strip.

Figure 15:
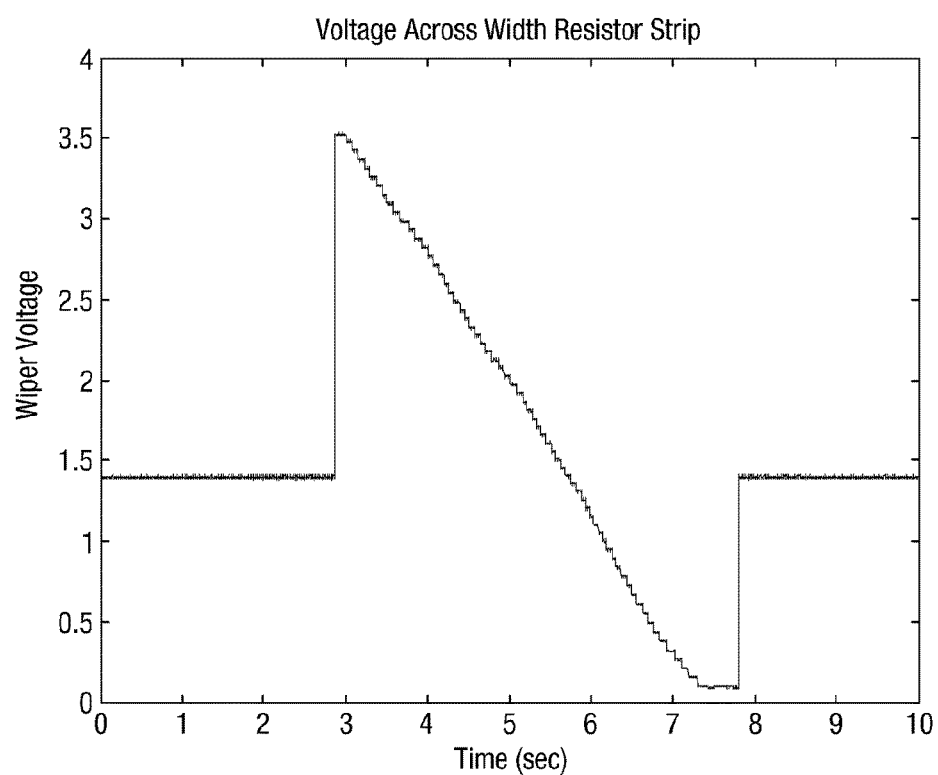
FIG. 15 shows a similar plot to FIG. 14a for a width resistor strip and a moving contact along a width of a sensor.

FIG. 15 shows a similar plot for the voltage drop over time when a sliding contact is drawn across the Width of a sensor and the wiper voltage (Length resistor strip) was sampled. In this example the width is considerably smaller than the length and so the steps are fewer and more clearly visible.

Figure 16:
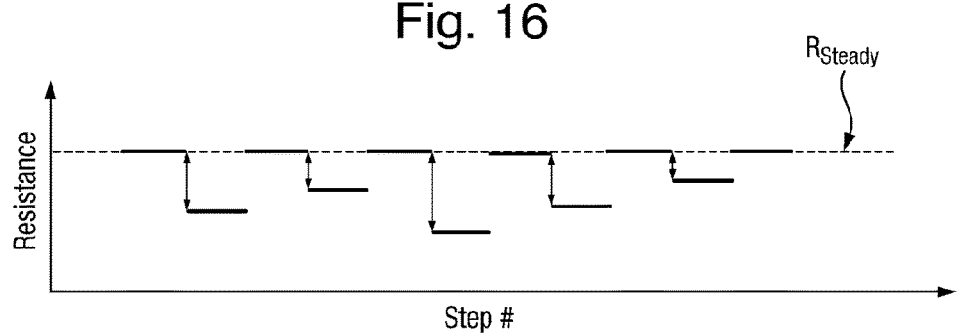
FIG. 16 illustrates a resistance measurement of the resistor strip when a moving contact actuates consecutive individual sensing elements.

Alternatively, the resistance of the resistor strip can be measured. If it can be ensured that a single resistance step is shorted by the contact (for example by means of a point contact such as in the example of FIG. 16) then the measured resistance will fluctuate between the un-shorted (total) resistance of the resistor strip and a resistance reduced by the shorted step i:

$$R_{STRIP} = R_{INITIAL} - R_i \quad (18)$$

where $R_{INITIAL}$ is the initial, un-shorted resistance of the strip, $R_{STRIP}$ is the measured resistance and $R_i$ is the resistance of the shorted step i. Shorting of just one step can be assured by careful selection of the contact point so that it is the correct size to bridge just two sensing elements. If multiple but not all resistive steps are measured, the value of the unmeasured steps can be estimated using interpolation techniques. It is possible to also use this method when shorting more than one step, provided that the number of resistance steps that is shorted is known but in this case the calibration process must make sure that the load will load the first step, then the first and the second, etc. until the whole load covers the maximum number of steps. Thereafter, the load can keep moving toward the other end of the sensor, in which case, for each new step loaded, the trailing step will be unloaded. If the resistance of the new and the trailing steps are close in value, it may not be possible to detect a change in the total resistance, in which case the step will not be identified. Although advanced detection techniques can be used, such as peak detection during the transition from one step to the next, this will complicate the process. It is therefore preferred to load/short one step at a time. In this case, the change of step could be detected because when the load is in between two steps, there won't be any shorted steps. For sensors with a smaller spacing between the sensing elements, this method is still less preferred than the "wiper" one because the spatial filtering effect of the substrate may result in more than one steps being loaded even when the load applicator is in between two steps.

It is also possible to use a movement of a calibration contact in two dimensions of a two dimensional sensor to calibrate the sensor in respect of both dimensions at the same time. This could be a contact placed at multiple known points across the array spaced apart in two dimensions, but preferably a sliding contact is used to give measurements for each sensing element. With this method the sensor calibration mode needs to switch between measurements in two dimensions in order to determine the values for impedance steps along two resistive elements. This switching needs to be done at a sufficient frequency to ensure that changes resulting from the contact traversing each sensing element in each dimension are identified, enabling all the impedance steps to be measured.

Yet another method to measure the resistive steps is to load the first step of the strip and then draw a second contact across the sensor area. This requires two separate contacts as the calibration contact. If these two contacts are lined up with a dimension of the sensor (Length or Width in the example sensor) then they will create a single, continuous short across the corresponding resistor strip. The measured resistance of the resistor strip decreases as the second contact travels across the sensor area; each decrease will represent the resistance of the additional impedance step $R_i$ that is shorted.

Figure 17:
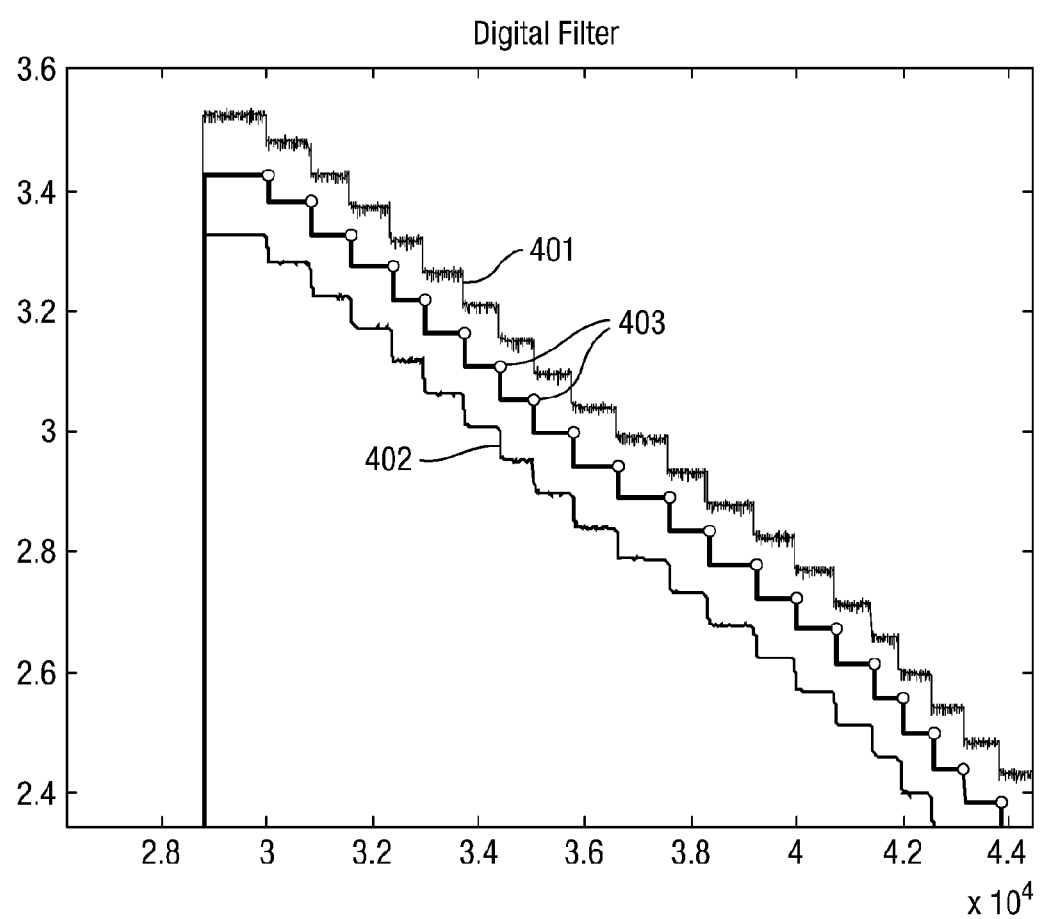
FIG. 17 shows the use of a filter to smooth measured voltage values.

It will be understood from FIGS. 14a and 15 that the measured voltage can be noisy. The same applies to resistance measurements. FIG. 17 illustrates the use of a two stage filter to smooth out the signal within each step, without affecting the transition between steps. The original data from the voltage measurement of FIG. 14b is shown as raw data 401. A moving average (low pass) filter is applied within each step to provide a moving average plot 402 and then a peak detection algorithm is used to mark the transitions 403. The signal levels between transitions are then replaced by their average value and these smoothed values can be used in the calculation of the resistance steps. The peak detection algorithm can be based on the detection of a larger than normal change on the signal, which will trigger the recognition of a step transition 403. The number of steps detected must match the known number of steps expected for the sensor. Identifying a different number of steps indicates that the calibration process has been imperfect and it needs to be repeated or that the sensor has physical defects such as broken or shorted electrodes, e.g. if the duration of a step is greater than the rest, it will be an indication of shorted sensor elements; if the voltage momentarily returns to its "unloaded" value it will be an indication of a broken sensor element that is no longer electrically connected to the resistor strip. The position of these defects can be identified so that the sensor can be repaired.

Calibrated Measurements

One calibration step per dimension of a sensor can therefore easily establish values of the resistance of impedance steps along the resistor strip corresponding to the positions of each sensing element. This can be as an average or, interpolated values or more preferably, as exact values for each step derived from a sliding calibration contact.

When the resistance of the impedance steps is known then, if the location of the load is known, the resistive mode can measure length and/or width with greater accuracy. In essence, if the first resistive step shorted is known, the calculated resistances of the following steps are added up until the sum matches the sensor reading. When that happens, the number of resistive steps added times the sensor's spatial resolution will produce the measured length (or width) of the contact. To do this using the resistive mode alone the system needs to know the starting position of the contact area. This can be ensured using a guide on the sensor. For example, in a foot measuring application, this restriction can be applied by lining up the heel of the foot against a stop (beginning of measurement) and allowing the foot to extend towards the free end of the sensor.

Alternatively, the position of a contact can be detected using the "wiper" mode; this eliminates the need for a position locator. The wiper mode can make use of the calibration data in a similar way to the resistive mode. The resistance of a portion of the resistor strip between the edge of the sensor and the edge of the contact is measured and this will correspond to the summation of resistances of the impedance steps in that part of the resistor strip. The number of impedance steps multiplied by the sensors spatial resolution will give the distance of the contact area from the sensor edge, and once the location of the edge of the contact area is known in terms of the number of impedance steps from an edge then the size of the contact area can be determined using the resistive mode based on the resistance measurement and matching this with the summation of the subsequent (calibrated) impedance steps beneath the contact. Alternatively, the wiper mode can also be used to measure the resistance of a portion of the resistor strip between the other edge of the sensor and the edge of the contact measured, therefore locating both ends of the contact and hence allowing the calculation of the contact length in each dimension.

The use of the "wiper" mode and the summation of resistances of the impedance steps described above allows for a very accurate determination of the distance I of the contact from the sensor's edge. This can be used with the method described above to determine the value of $R_{trace}$ with a greater accuracy.

It will also be understood that the calibration technique can be used as a quality control measurement for the types of sensors described above, and similar sensors. The measurements used in the calibration method can be used as a check to ensure that the resistance of the impedance steps all fall within a required tolerance and/or to identify broken or damaged traces. A completely broken trace will not short the resistor strip and therefore an expected step in voltage or resistance will not occur. A shorted trace will short more than one steps and therefore the step in voltage or resistance will be greater than expected, i.e. it will be the sum of the shorted steps. A damaged trace may have an unusually high resistance, which will compromise the shorting of the corresponding step giving the appearance of an artificially small resistance for the corresponding impedance step.

Sensor Structure

The specific operation of the calibration method has been explained above with reference to the exemplary sensors shown in the Figures. This sensor is the subject of co-pending International (PCT) Patent application No. PCT/GB2013/053214 and further detail of the sensor can be found in that document. However, it should be understood that the method of the present invention is not limited to this exemplary sensor. The method can also be used with any of the other types of sensor identified in the foregoing discussion, and is more generally applicable to any sensor with a broadly similar structure. For example, the method has advantages for any sensor of the type comprising conductive traces in a sensing area or any other type of discrete and spaced apart sensing elements, where separation of electrical connections along a resistive strip is used in the determination of a contact location or contact area. By way of more specific examples, the use of the calibration method with two prior art sensors as found in U.S. Pat. No. 4,587,378 and U.S. Pat. No. 4,963,702 is described below.

U.S. Pat. No. 4,587,378 discloses a sensor using interdigitated electrodes. As will be understood from a review of FIGS. 1 and 2 of U.S. Pat. No. 4,587,378, and the related description, if the distance between the interdigitated electrodes is known then a contact point moving across the x or y directions will generate discrete changes in the sensor's output. These changes will be proportional to the value of the resistive lengths (steps) between the electrodes that cross the resistor strip. For example, in FIG. 1 of U.S. Pat. No. 4,587,378, when a contact travels in the direction from 12a to 12b, the contact will be shorting electrode 17 with the different electrodes 15 that cross resistor strip 12. When a short occurs, 5V will be applied to the resistor strip across its length, and the sensor will measure a "Y" output between 5V and the end of the resistor strip 12b. A more detailed description of the operation of the sensor of U.S. Pat. No. 4,587,378 can be found in columns 3 and 4 of the particular patent. As with other prior art sensors, U.S. Pat. No. 4,587,378 assumes that the resistor steps are constant. Nonetheless, this is not necessarily true since different manufacturing methods (or quality of discrete resistor components) may result in different step-to-step uniformities.

The proposed calibration method(s) can quantify the value of the resistor steps and therefore improve the accuracy of the reported contact position of this sensor.

Another example of a sensor that can benefit from the proposed calibration method is disclosed in U.S. Pat. No. 4,963,702. This particular sensor can measure the resistance between the ends of a contact and the resistor strip's ends and therefore identify the contact's position and length. Once again it is assumed in U.S. Pat. No. 4,963,702 that the resistor strip is divided into uniform steps. In cases where it is not uniform then the method of U.S. Pat. No. 4,963,702 will result in significant measurement errors. The current method hence advantageously can be used to identify and record variations in the resistance steps. This will improve accuracy of the sensor of U.S. Pat. No. 4,963,702 by allowing a modified measurement mode to take account of the calibrated values.

The invention claimed is:

1. A method of calibration of a contact sensor apparatus comprising an array of discrete and spaced apart sensing elements connected to a resistive element with a location or size of a contact being detectable by measurement of one or more electrical parameter(s) relating to impedance steps along the resistive element, the method comprising:

applying one or more calibration contact(s) at a plurality of locations across the sensing elements to be calibrated;

monitoring changes in at least one electrical parameter of the one or more electrical parameter(s) during a time that the one or more calibration contact(s) are applied, wherein the at least one electrical parameter is related to a resistance of the resistive element along its length as the one or more calibration contact(s) short different impedance steps thereof;

recording information relating to variation in the at least one electrical parameter, the recorded information allowing assessment of variation in each impedance step along the resistive element; and wherein at least one of the location and the size of the contact is corrected based on the recorded information relating to the variation in the at least one electrical parameter.

2. The method as claimed in claim 1, comprising measuring a resistance across the resistive element with one or more impedance steps shorted out, and calculating a resistance for individual impedance steps based on the measured resistance during calibration and a known total resistance for the resistive element.

3. The method as claimed in claim 1, wherein the at least one electrical parameter is related to a resistance of a part of the resistive element between two contacts.

4. The method as claimed in claim 1 wherein the at least one electrical parameter is a voltage or current relating to resistance of a portion of the resistive element extending from one end of the resistive element to a point on the resistive element corresponding to a location of the plurality of locations of the one or more calibration contact(s).

5. The method as claimed in claim 1 wherein the recording information relating to variation in the at least one electrical parameter comprises recording a table of a measurement of the at least one electrical parameter and/or of information relating to a resistance for the impedance steps relating to each element of the sensing elements.

6. The method as claimed in claim 1, comprising using a calibration mode during which the contact sensor apparatus is configured for a continuous measurement of the at least one electrical parameter.

7. The method as claimed in claim 1 being used for calibration of sensors capable of sensing in two dimensions, wherein the applying one or more calibration contact(s) at the plurality of locations includes applying a first calibration contact at a plurality of locations along a first dimension of the array of discrete and space apart sensing elements, and applying a second calibration contact at a plurality of locations along a second dimension of the array of discrete and space apart sensing elements.

8. The method as claimed in claim 1 being used for calibration of sensors capable of sensing in two dimensions, wherein the applying one or more calibration contact(s) at the plurality of locations includes applying a calibration contact at a plurality of locations along both a first dimension of the array of discrete and space apart sensing elements and along a second dimension of the array of discrete and space apart sensing elements.

9. The method as claimed in claim 1 wherein the applying one or more calibration contact(s) at the plurality of locations across the sensing elements to be calibrated includes a continuous movement of at least one calibration contact on a sensing surface of the contact sensor apparatus.

10. The method as claimed in claim 9, wherein a speed of the continuous movement of the at least one calibration contact is equal to or less than one tenth of a spacing between the sensing elements multiplied by a sampling rate used in measuring the at least one electrical parameter(s) and divided by a number of dimensions of the contact sensor apparatus when the contact sensor apparatus is arranged to measure a calibration contact in more than one dimension.

11. The method as claimed in claim 1 wherein the applying one or more calibration contact(s) at the plurality of locations across the sensing elements to be calibrated comprises sequential placement of a calibration contact at several known locations that are spaced apart across a sensor area with a plurality of sensing elements between each location.

12. The method as claimed in claim 1 wherein the applying one or more calibration contact(s) at the plurality of locations across the sensing elements to be calibrated comprises simultaneous placement of multiple calibration contacts at several known locations that are spaced apart across a sensor area with a plurality of sensing elements between each location.

13. The method as claimed in claim 1 wherein a movement or spaced locations of the one or more calibration contact(s) align with a dimension measured by the sensing elements.

14. The method as claimed in claim 1 comprising determining if a level of variation in resistance of the impedance steps falls below a preset threshold to thereby determine that the contact sensor apparatus is of sufficient quality and/or accuracy.

15. The method as claimed in claim 1 comprising identifying unusual measurements indicative of a shorted, damaged or broken sensing element.

16. The method as claimed in claim 1 wherein the contact sensor apparatus comprises a layer with sensing elements in a form of multiple conductive traces and arranged so that a contact on a sensing surface of the contact sensor apparatus completes an electrical circuit involving one or more conductive traces of the multiple conductive traces, whereby a location and/or area of the contact can be determined by identifying the one or more conductive traces that are involved.

17. A non-transitory computer program product comprising instructions that, when executed by a processor of the contact sensor apparatus, causes the contact sensor apparatus to perform the method of claim 1.

18. A contact sensor apparatus comprising an array of discrete and spaced apart sensing elements connected to a resistive element with a location or size of a contact being detectable by measurement of one or more electrical parameter(s) relating to impedance steps along the resistive element; and a processor;

wherein the processor is arranged to, in response to one or more calibration contact(s) applied at a plurality of locations across the sensing elements to be calibrated, monitor changes in at least one electrical parameter of the one or more electrical parameter(s) during a time that the one or more calibration contact(s) are applied, wherein the at least one electrical parameter is related to a resistance of the resistive element along its length as the one or more calibration contact(s) short different impedance steps thereof; and record information relating to variation in the at least one electrical parameter, the recorded information allowing assessment of variation in each impedance step along the resistive element; wherein at least one of the location and the size of the contact is corrected based on the recorded information relating to the variation in the at least one electrical parameter.

19. The contact sensor apparatus as claimed in claim 18 comprising a layer with sensing elements in a form of multiple conductive traces and arranged so that a contact on a sensing surface of the contact sensor apparatus completes an electrical circuit involving one or more conductive traces of the multiple conductive traces, whereby a location and/or area of the contact can be determined by identifying the one or more conductive traces that are involved.

* * * * *